US009426529B2

(12) United States Patent
Lee

(10) Patent No.: US 9,426,529 B2
(45) Date of Patent: Aug. 23, 2016

(54) DISPLAY DEVICE AND METHOD FOR PROVIDING CONTENT USING THE SAME

(75) Inventor: Sangseok Lee, Pyeongtaek-si (KR)

(73) Assignee: LG LECTRONICS INC., Seoul (KR)

( * ) Notice: Subject to any disclaimer, the term of this patent is extended or adjusted under 35 U.S.C. 154(b) by 417 days.

(21) Appl. No.: 13/445,119

(22) Filed: Apr. 12, 2012

(65) Prior Publication Data

US 2013/0047065 A1 Feb. 21, 2013

(30) Foreign Application Priority Data

Aug. 16, 2011 (KR) .......................... 10-2011-0080990

(51) Int. Cl.
| | | |
|---|---|---|
| *H04N 21/4782* | (2011.01) | |
| *G06F 3/0484* | (2013.01) | |
| *G06F 17/30* | (2006.01) | |
| *H04N 21/422* | (2011.01) | |
| *H04N 21/431* | (2011.01) | |
| *H04N 21/462* | (2011.01) | |
| *H04N 21/4788* | (2011.01) | |
| *H04N 21/858* | (2011.01) | |

(52) U.S. Cl.
CPC ........ *H04N 21/4782* (2013.01); *G06F 3/04842* (2013.01); *G06F 17/3089* (2013.01); *H04N 21/42204* (2013.01); *H04N 21/4316* (2013.01); *H04N 21/4622* (2013.01); *H04N 21/4788* (2013.01); *H04N 21/8586* (2013.01)

(58) Field of Classification Search
USPC ......... 715/229, 234, 255, 256, 764, 810, 835, 715/840, 846, 847, 864
See application file for complete search history.

(56) References Cited

U.S. PATENT DOCUMENTS

| | | | | |
|---|---|---|---|---|
| 5,652,714 A | * | 7/1997 | Peterson et al. ................. 702/57 |
| 5,774,664 A | * | 6/1998 | Hidary .................... H04L 29/06 348/E7.024 |
| 6,018,768 A | * | 1/2000 | Ullman ................... H04L 29/06 348/E7.024 |
| 6,025,837 A | * | 2/2000 | Matthews et al. ............. 715/721 |
| 6,038,598 A | * | 3/2000 | Danneels ...................... 709/219 |
| 6,067,558 A | * | 5/2000 | Wendt et al. .................. 709/202 |
| 6,519,571 B1 | * | 2/2003 | Guheen et al. ............. 705/14.66 |
| 6,976,215 B1 | * | 12/2005 | Roderick ................ G06F 3/016 345/184 |
| 7,120,871 B1 | * | 10/2006 | Harrington .............. G09G 5/00 348/E7.061 |

(Continued)

FOREIGN PATENT DOCUMENTS

| | | |
|---|---|---|
| CN | 101395567 A | 3/2009 |
| EP | 1 172 726 A2 | 1/2002 |

(Continued)

OTHER PUBLICATIONS

McFedries; Microsoft Windows XP Unleashed; Sep. 6, 2005; Sams Publishing; pp. 59-79 and 455-496.*

(Continued)

*Primary Examiner* — Andrew Dyer
(74) *Attorney, Agent, or Firm* — KED & Associates, LLP

(57) ABSTRACT

A display device and a method for providing content in the display device are disclosed, in which a display displays a menu screen including selectable icons representing a plurality of execution modes that indicate versions of content to be displayed, and a controller detects a user action for selecting an icon, identifies an execution mode indicated by the selected icon, in response to the detected user action, and executes the content in the identified execution mode. The plurality of execution modes may include edited version mode, Web mode, and application mode.

16 Claims, 21 Drawing Sheets

(56) References Cited

U.S. PATENT DOCUMENTS

| | | | |
|---|---|---|---|
| 7,805,673 B2* | 9/2010 | der Quaeler | G06F 17/30634 715/255 |
| 7,917,927 B1* | 3/2011 | Morrison | H04N 5/44543 715/718 |
| 7,996,780 B1* | 8/2011 | Mitnick | 715/762 |
| 8,205,169 B1* | 6/2012 | Donohoe et al. | 715/790 |
| 8,250,458 B2* | 8/2012 | Jerrard-Dunne et al. | 715/209 |
| 8,341,529 B1* | 12/2012 | Li et al. | 715/741 |
| 8,464,148 B1* | 6/2013 | Wichary | 715/255 |
| 2002/0032906 A1* | 3/2002 | Grossman | 725/42 |
| 2002/0138624 A1* | 9/2002 | Esenther | 709/227 |
| 2004/0055018 A1* | 3/2004 | Stone | 725/113 |
| 2004/0139092 A1 | 7/2004 | Jones, Jr. et al. | |
| 2004/0148626 A1* | 7/2004 | Sakao | H04N 21/4312 725/37 |
| 2004/0268231 A1* | 12/2004 | Tunning | 715/513 |
| 2005/0066366 A1* | 3/2005 | Takamine | H04N 5/44591 725/59 |
| 2007/0157105 A1 | 7/2007 | Owens et al. | |
| 2008/0222237 A1* | 9/2008 | Nathan et al. | 709/202 |
| 2010/0042283 A1 | 2/2010 | Kell et al. | |
| 2012/0192231 A1* | 7/2012 | Maa | 725/38 |

FOREIGN PATENT DOCUMENTS

| | | |
|---|---|---|
| JP | 2004-153375 A | 5/2004 |
| KR | 10-1999-0019205 A | 3/1999 |
| KR | 10-2003-0038016 A | 5/2003 |
| KR | 10-2005-0045028 A | 5/2005 |

OTHER PUBLICATIONS

Colligan et al.; Special Edition Using Microsoft Office FrontPage 2003; 2004; Que Publishing; pp. 50-91 and 276-290.*

"Menu" and "menu item;" Microsoft Computer Dictionary; May 1, 2002; Fifth Edition; p. 423.*

Ali Wed; How to Connect a Computer to a Television via HDMI; Apr. 22, 2009; HueStones.com; pp. 1-7.*

Conder et al.; Launching the Browser From Your Android Applications—The Easy Way; Sep. 1, 2010; Tutsplus.com; pp. 1-15.*

Shankar Ganesh; Feedly—A New Firefox Start Page Addon You Can't Afford to Miss; Jun. 26, 2008; MakeUsOf.com; pp. 1-4.*

Kyle Gibb; Fast app switching; Jul. 21, 2010; Android Central; pp. 1-9.*

* cited by examiner

| Content Information | URL |
|---|---|
| Picasa | www.picasa.com |
| Twitter | www.twitter.com |
| KBS | www.kbs.co.kr |
| Face book | www.facebook.com |

(a)

(b)

DISPLAY DEVICE AND METHOD FOR PROVIDING CONTENT USING THE SAME

Pursuant to 35 U.S.C. §119(a), This application claims the benefit of Korean Patent Application No. 10-2011-0080990, filed on Aug. 16, 2011, which is hereby incorporated by reference as if fully set forth herein.

BACKGROUND OF THE INVENTION

1. Field of the Invention

The present invention relates to a display device and a method for providing content using the same, and more particularly, to a display device for receiving a Web page from a Web site and displaying the received Web page and a method for providing content in the display device.

2. Discussion of the Related Art

A display device has, for example, a function of displaying broadcast images to a user. The display device displays a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

For digital broadcasting, multimedia devices have been developed toward high performance and diverse functions. Furthermore, many services such as Internet service, Video On Demand (VOD), and electronic album service are now available in the multimedia devices.

A display device can execute a dedicated application for receiving information from a content provider and display a Web page of the content provider through a browser. However, information provided by the dedicated application is not identical to information on the Web page. Therefore, a user needs to compare the information by executing the application and the browser individually in many cases.

SUMMARY OF THE INVENTION

Accordingly, the present invention is directed to a display device and a method for providing content using the same that substantially obviate one or more problems due to limitations and disadvantages of the related art.

An object of the present invention is to provide a display device for fast displaying a Web page associated with information provided by an application during execution of the application and a method for providing content in the display device.

Another object of the present invention is to provide a display device for fast displaying an application associated with a Web page displayed on a browser during execution of the browser and a method for providing content in the display device.

Another object of the present invention is to provide a display device for reflecting a function supported by a Web page displayed on a browser or a setting of the Web page in an application and a method for providing content in the display device.

A further object of the present invention is to provide a display device for providing content received from a content provider in various modes and a method for providing content in the display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for providing content in a display device includes displaying a menu screen including selectable icons representing a plurality of execution modes that indicate versions of content to be displayed, detecting a user action for selecting an icon, identifying an execution mode indicated by the selected icon, in response to the detected user action, and executing the content in the identified execution mode.

The method may further include accessing a memory area in which a content list including items associated with the icons is stored, and configuring the menu screen using the content list.

The versions of the content may include at least one of a Web version, an application version, or an edit version.

The plurality of execution modes may include at least one of edited version mode, Web mode or application mode.

When the execution mode indicated by the selected icon is edited version mode, an edited application associated with the content may be executed.

The edited application may be an application associated with the content, edited to reflect information, a function, and a setting of a Web page associated with the content.

An execution screen of the edited application may further include a selectable icon indicating edit mode being an operation mode for providing a service of editing the content.

When the execution mode indicated by the selected icon is Web mode, a Web browser may be launched and the display device may be connected to a Uniform Resource Locator (URL) associated with the content through the launched Web browser. When the execution mode indicated by the selected icon is application mode, an application associated with the content may be executed.

An execution screen of the content may display a selectable icon indicating an execution mode other than the execution mode indicated by the selected icon.

In another aspect of the present invention, a display device includes a display configured to display a menu screen including selectable icons representing a plurality of execution modes that indicate versions of content to be displayed, and a controller configured to detect a user action for selecting an icon, to identify an execution mode indicated by the selected icon, in response to the detected user action, and to execute the content in the identified execution mode.

In another aspect of the present invention, a method for providing content in a display device includes detecting a user action for requesting execution of content, displaying the requested content in response to the detected user action, detecting a user action for requesting movement to a Web, searching for a URL associated with the displayed content in response to the detected user action, launching a browser and connecting to the detected URL through the launched browser, and displaying a Web page received as a result of the connection on the browser. The content may be a pre-stored application. A content provider associated with the content may be identical to a content provider connected through the URL.

The URL may be searched for in a link table including a content name, a URL, and information that maps the content name to the URL.

A Graphical User Interface (GUI) may further be displayed to receive the request for movement to the Web.

The displayed content may be selected based on information about a version of the content associated with a logged-on user and then displayed.

The method may further include detecting a user action for requesting reflecting a function of the Web page in the content, and updating the content by reflecting the function of the Web page in the content in response to the detected user action.

Position information indicating a position at which the function of the Web page is displayed and function information for providing the function of the Web page may be obtained and the content may be updated based on at least one of the obtained position information or the obtained function information.

The method may further include detecting a user action for requesting reflecting a setting of the Web page in the content, and updating the content by reflecting the setting of the Web page in the content in response to the detected user action.

In another aspect of the present invention, a method for providing content in a display device includes detecting a user action for requesting launching a browser, launching the browser in response to the detected user action, detecting a user action for requesting movement to content, searching for content associated with a Web site that provides a Web page displayed on the browser, and displaying the detected content.

An input window of the launched browser may be displayed, the display device may be connected to a URL input in the input window through the launched browser, and a Web page received as a result of the connection may be displayed on the browser.

In a further aspect of the present invention, a display device includes a controller configured to detect a user action for requesting execution of content, to control display of the requested content in response to the detected user action, to detect a user action for requesting movement to a Web, searching for a URL associated with the content in response to the detected user action, launching a browser, and to control connection to the detected URL through the launched browser, and a network interface configured to receive a Web page transmitted as a result of the connection.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 illustrates a link table according to an embodiment of the present invention.

DETAILED DESCRIPTION OF THE INVENTION

Reference will now be made in detail to the preferred embodiments of the present invention, examples of which are illustrated in the accompanying drawings. The configuration and operation of the present invention as illustrated in and explained by the drawings are described as at least one embodiment, which should not be construed as limiting the technical spirit and the key configuration and operation of the present invention.

Although the terms used in the present invention are selected from generally known and used terms, taking into account functions of the present invention, they are subject to change depending on the intention of an operator in the art, practices, or the advent of a new technology. Some of the terms mentioned in the description of the present invention have been selected by the applicant at his or her discretion, the detailed meanings of which are described in relevant parts of the description herein. Accordingly, the present invention must be understood, not simply by the actual terms used but by the meanings of each term lying within.

Figure 1:
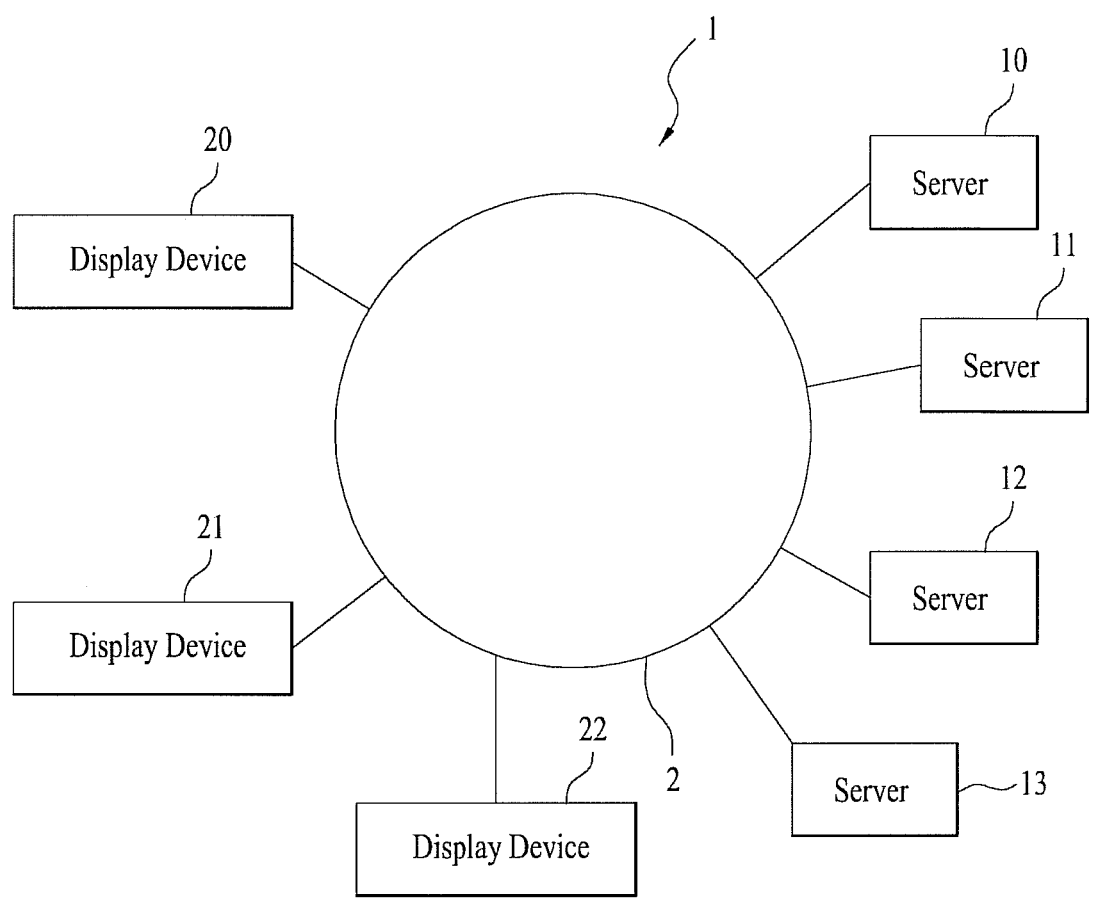
FIG. 1 is a block diagram of a service providing system according to a preferred embodiment of the present invention.

FIG. 1 is a block diagram of a service providing system according to a preferred embodiment of the present invention.

Referring to FIG. 1, a service providing system 1 according to the present invention may include one or more servers 10, 11, 12 and 13 and one or more display devices 20, 21, and 22. The servers 10, 11, 12 and 13 may be connected to the display devices 20, 21 and 22 through a network 2.

The network 2 may include a backbone network and a subscriber network. The backbone network may be an integrated network with one or more of an X.25 network, a Frame Relay network, an Asynchronous Transfer Mode (ATM) network, a Multi Protocol Label Switching (MPLS) network, and a Generalized Multi Protocol Label Switching (GMPLS). The subscriber network may be any of Fiber To The Home (FTTH) network, Asymmetric Digital Subscriber Line (ADSL), a cable network, Wireless Local Area Network (WLAN) (conforming to Institute of Electrical and Electronics Engineers (IEEE) 802.11b, IEEE 802.11a, IEEE802.11g, or IEEE802.11n), Wireless Broadband (WiBro), Worldwide Interoperability for Microwave Access (WIMAX), and High Speed Downlink Packet Access (HSDPA).

In accordance with an embodiment of the present invention, the network 2 may be the Internet.

The servers 10, 11, 12 and 13 may be service providers or content providers. The servers 10, 11, 12 and 13 may provide real-time broadcast service and Internet service to the display devices 20, 21 and 22. The Internet service covers a broad range of services that can be provided over the Internet, such as information service including Content on Demand (CoD), YouTube, weather, news, region information, and search, entertainment service including gaming and karaoke, and communication service including TV mail and TV Short Message Service (SMS).

The servers 10, 11, 12 and 13 may be Web sites. That is, the servers 10, 11, 12 and 13 may provide Web service to the display devices 20, 21 and 22. The servers 10, 11, 12 and 13 may also store Web pages at positions indicated by specific Uniform Resource Locators (URLs). The Web service may refer to any service provided by a Web protocol.

The display devices 20, 21 and 22 may access at least one of the servers 10, 11, 12 or 13 and thus may receive the real-time broadcast service and the Internet service from the accessed server. The display devices 20, 21 and 22 may receive the Internet service using an application. The application may be a dedicated application that can connect to a specific server and may be stored in the display devices 20, 21 and 22. The application may also be created through an Application Programmer Interface (API) provided by the server. The API may be Open API.

The display devices 20, 21 and 22 may receive Web pages stored at positions indicated by specific URLs from the servers 10, 11, 12 and 13.

Figure 2:
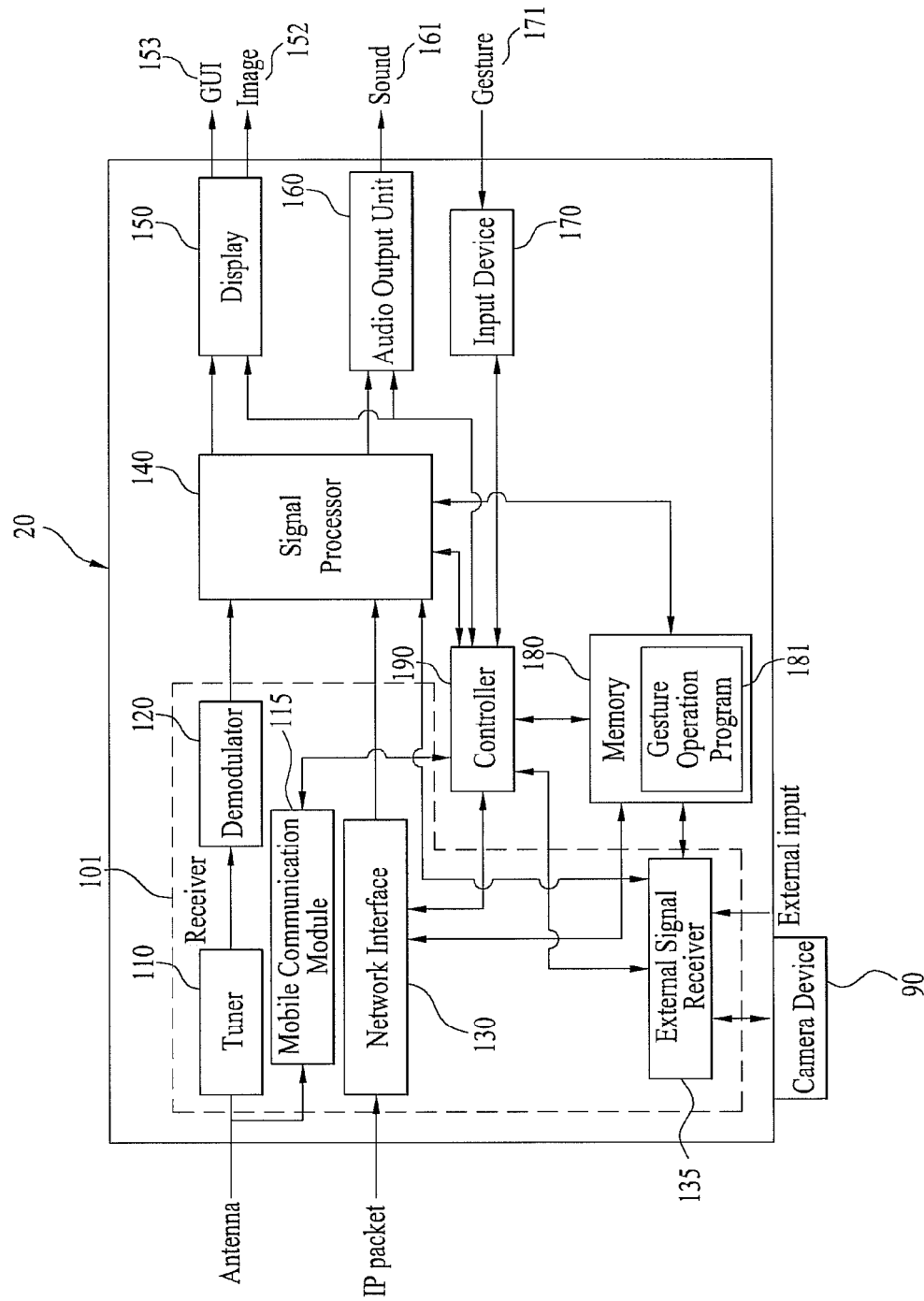
FIG. 2 is a block diagram of a display device according to a preferred embodiment of the present invention.

FIG. 2 is a block diagram of a display device according to a preferred embodiment of the present invention.

Referring to FIG. 2, the display device 20 according to the present invention may include a receiver 101, a signal processor 140, a display 150, an audio output unit 160, an input device 170, a memory 180, and a controller 190. The display device 20 may include a camera device 90 in an embodiment of the present invention.

The receiver 101 may receive real-time broadcast service and Internet service. The receiver 101 may include a tuner 110, a demodulator 120, a mobile communication module 115, a network interface 130, and an external signal receiver 135.

The network interface 130 may transmit a packet carrying a connection request signal and a packet carrying authentication information to the server 10 through the network 2. The network interface 130 may also receive a packet carrying data of a service and a packet carrying data of a Web service from the server 10 through the network 2. The service may include real-time broadcast service and the Internet service, and the Web service may be a service transmitted by a Web protocol.

The signal processor 140 demultiplexes a stream signal received from the demodulator 120 into a video signal and an audio signal, processes the video signal and the audio signal (i.e. video decoding and audio decoding), and then outputs an image 152 to the display 150 and sound 161 to the audio output unit 160. The signal processor 140 may also receive video data, audio data, and broadcast data from the mobile communication module 115, the network interface 130, and the external signal receiver 135.

The display 150 displays the image 152. The display 150 may operate in connection with the controller 190. The display 150 may display a Graphical User Interface (GUI) 153 that provides a user-friendly interface between a user and an OS or an application executed on the OS.

The audio output unit 160 may receive audio data from the signal processor 140 and the controller 190 and output the sound 161 reproduced from the received audio data.

The input device 170 may be a touch screen disposed on or in front of the display 150 and may be a communication module for receiving signals from a remote controller.

The memory 180 typically provides space for storing program code and data used by the display device 20. The program code may be application code and the data may be for displaying a GUI. The memory 180 may also store a content list that lists content items in different execution modes for the same content in a specific storage area. Execution modes are operation modes of an image processing device that executes content, including at least one of Web mode, application mode, or edited version mode. An execution mode may indicate a version of content to be executed. To be specific, the Web mode may indicate display of a Web page associated with content, the application mode may indicate display of an application associated with the content, and the edited version mode may indicate display of an edited version of the application. An application associated with content may be a dedicated application that can connect to a specific server. The application may be stored in the display device or received from the server when the application is to be executed. The application may be created by an API provided by the server.

The memory 180 may be configured to include a Read Only Memory (ROM), a Random Access Memory (RAM), a hard disk drive, etc. Program code and data may exist in a detachable storage medium so that they may be loaded on the display device 20, when needed. Detachable storage media may include a CD-ROM, a PC-CARD, a memory card, a floppy disk, a magnetic tape, and a network component.

The controller 190 executes commands and performs operations associated with the display device 20. For example, the controller 190 may control input and output and data reception and processing between components of the display device 20, using commands retrieved from the memory 180. The controller 190 may be implemented on a single chip, a plurality of chips, or a plurality of electrical parts. For example, diverse architectures such as a dedicated or embedded processor, a single-purpose processor, an Application Specific Integrated Circuit (ASIC), etc. are available for implementation of the controller 190.

The controller 190 executes computer code with the OS and generates and uses data. The OS is well-known and will not be described in detail herein. The OS may be any of an OS from WINDOWS series, UNIX, LINUX, PALM OS, DOS, ANDROID, MACINTOSH, etc. The OS, other computer code, and data may exist in the memory 180 that operates in connection with the controller 190.

The controller 190 may detect a user action and control the display device 20 based on the detected user action. User actions may include selecting a physical button on the display device 20 or the remote controller, drawing a predetermined gesture on the display plane of a touch screen, selecting a soft button on the touch screen, making a predetermined gesture that will be sensed from an image captured by a camera device, and making a predetermined utterance sensed by voice recognition.

A gesture 171 may be defined as a formalized interaction with the input device 170, mapped to one or more specific computing operations. A gesture may be made with a hand or hands, particularly with finger motions in many ways. Alternatively or additionally, a gesture may be drawn with a stylus.

The input device 170 receives the gesture 171 and the controller 190 executes commands for performing operations associated with the gesture 171. The memory 180 may include a gesture operation program 181 that may be a part of the OS or a part of an independent application. The gesture operation program 181 generally includes a series of commands that recognize occurrence of the gesture 171 and notify one or more software agents of the gesture 171 and/or an action or actions to be taken in response to the gesture 171.

The controller 190 may detect a user action for requesting content execution and thus may control display of the requested content in response to the detected user action. Upon detecting a user action for requesting move to the Web while content is being displayed on a screen, the controller 190 searches for a URL associated with the displayed content. Then the controller 190 may launch a browser, control reception of a Web page stored at a position indicated by the detected URL based on a Web protocol, and control display of the received Web page on the browser.

The controller 190 detects a user action for requesting launching the browser and launches the browser in response to the detected user action. Upon detecting a user action for requesting move to content while the browser is being displayed on a screen, the controller 190 may search for content associated with the URL of a Web page displayed on the browser and control display of the detected content.

When an application is edited, the controller 190 may update a content list stored in the memory 180 so as to reflect information about the edited application in the content list.

Figure 3:
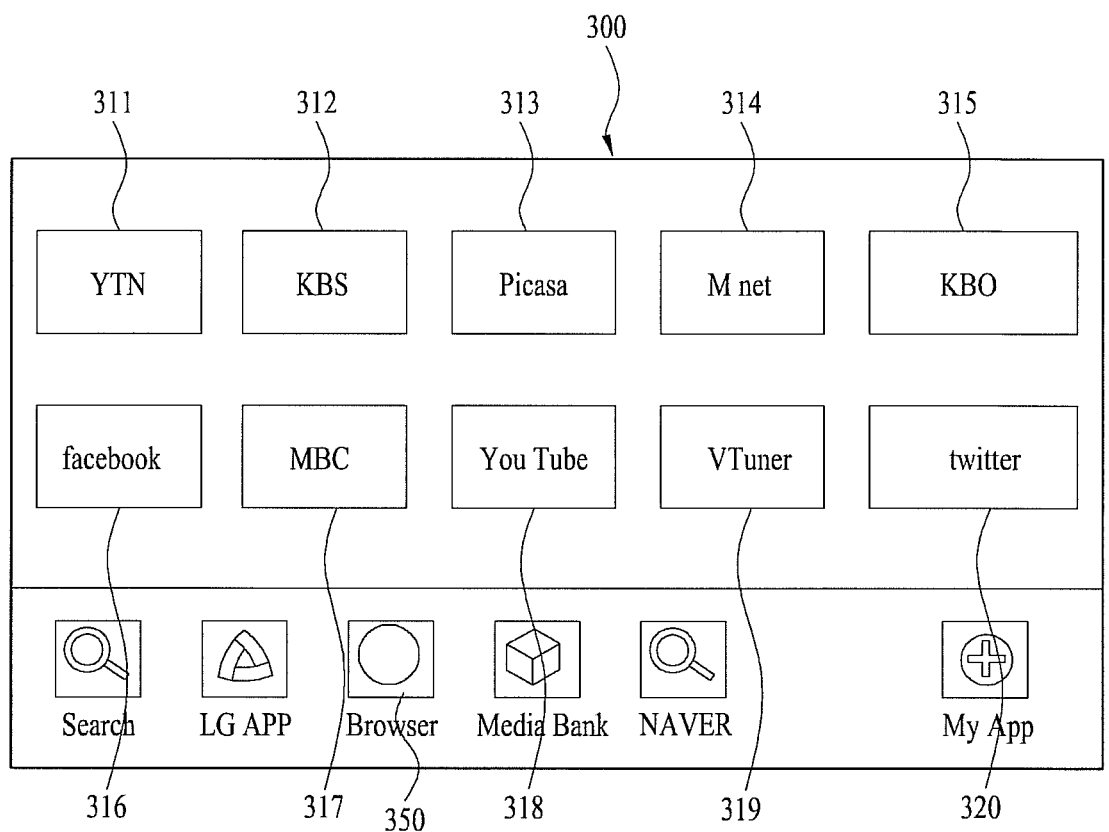
FIG. 3 illustrates a screen that displays a content list according to an embodiment of the present invention.

FIG. 3 illustrates a screen that displays a content list according to an embodiment of the present invention.

Referring to FIG. 3, the display 150 may display a screen 300. The screen 300 may be a background screen of the display device 20 in an embodiment of the present invention in an embodiment of the present invention. When the controller 190 detects a user action for requesting display of a content list, the controller 190 may control display of the screen 300 in response to the detected user action in an embodiment of the present invention.

Content icons 311 to 320 and a browser icon 350 are displayed on the screen 300. The content icons 311 to 320 represent specific content. For instance, the content icon 312 represents Korea Broadcasting System (KBS) content, the content icon 316 represents FACEBOOK content, and the content icon 320 represent TWITTER content. A user may take a user action for requesting execution of content represented by a specific content icon by selecting the content icon. Herein, content may be an application. The application may be a dedicated application that can connect to a specific server and may be stored in the display device 20. The application may be one that was created through an API provided by the server. The API may be Open API.

Upon detecting a user action for pressing a content icon, the controller 190 identifies the user action as a request for content execution and executes content represented by the selected content icon. The display 150 displays an execution screen of the content.

For example, upon detecting a user action for pressing the content icon 320, the controller 190 executes the TWITTER content represented by the content icon 320. The TWITTER content is a dedicated application that enables connection to a TWITTER server and the program code of the TWITTER content may be stored in the memory 180.

Figure 4:
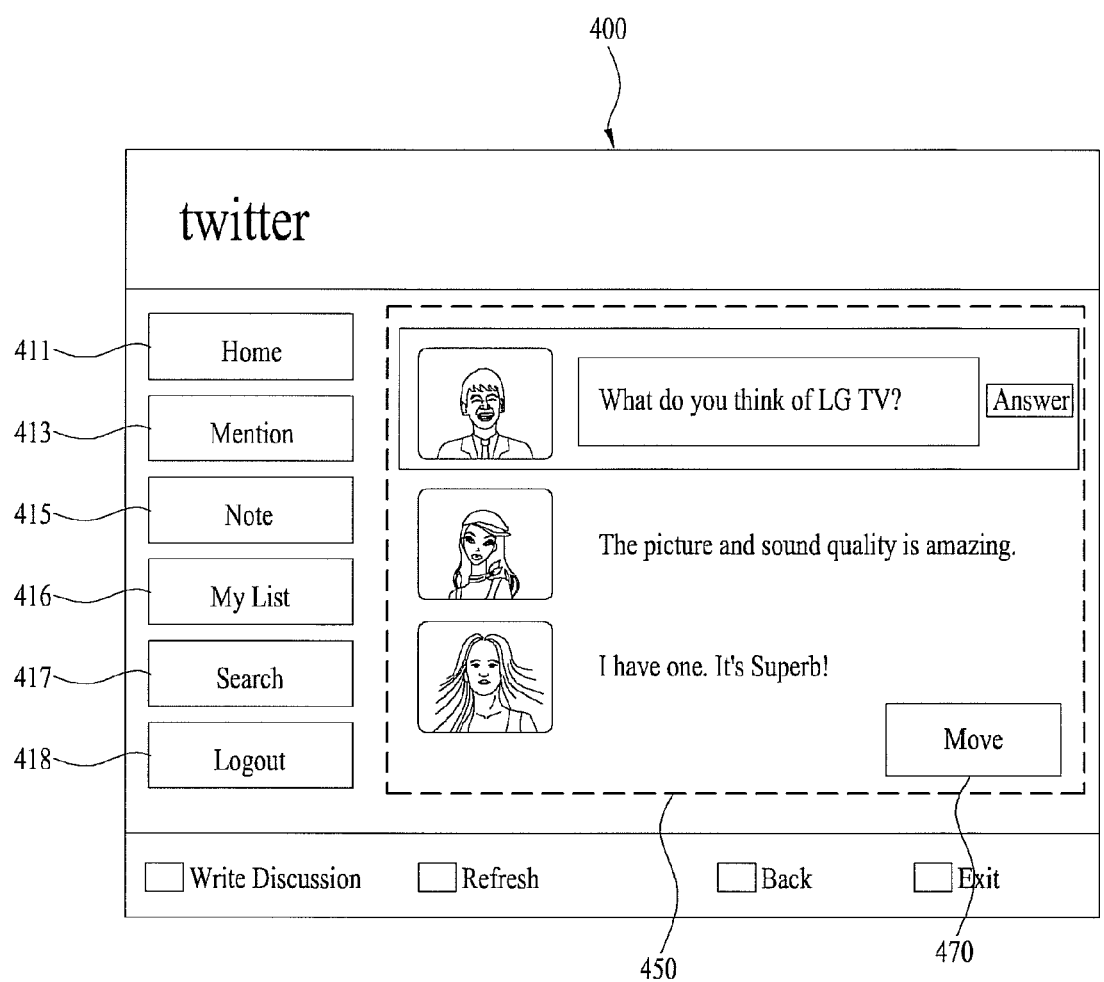
FIG. 4 illustrates a screen that displays content according to an embodiment of the present invention.

FIG. 4 illustrates a screen that displays content according to an embodiment of the present invention.

Referring to FIG. 4, the display 150 may display a screen 400. The screen 400 displays a content execution screen. The screen 400 may further display a Move button 470. The Move button 470 may be a GUI for receiving a request for movement to the Web.

The screen 400 includes menus 411, 413, 415, 416, 417 and 418 and a received information display area 450. The menus 411, 413, 415, 416, 417 and 418 are generated by executing stored program code, and information received from the server 10 is displayed in the received information display area 450.

Figure 5:
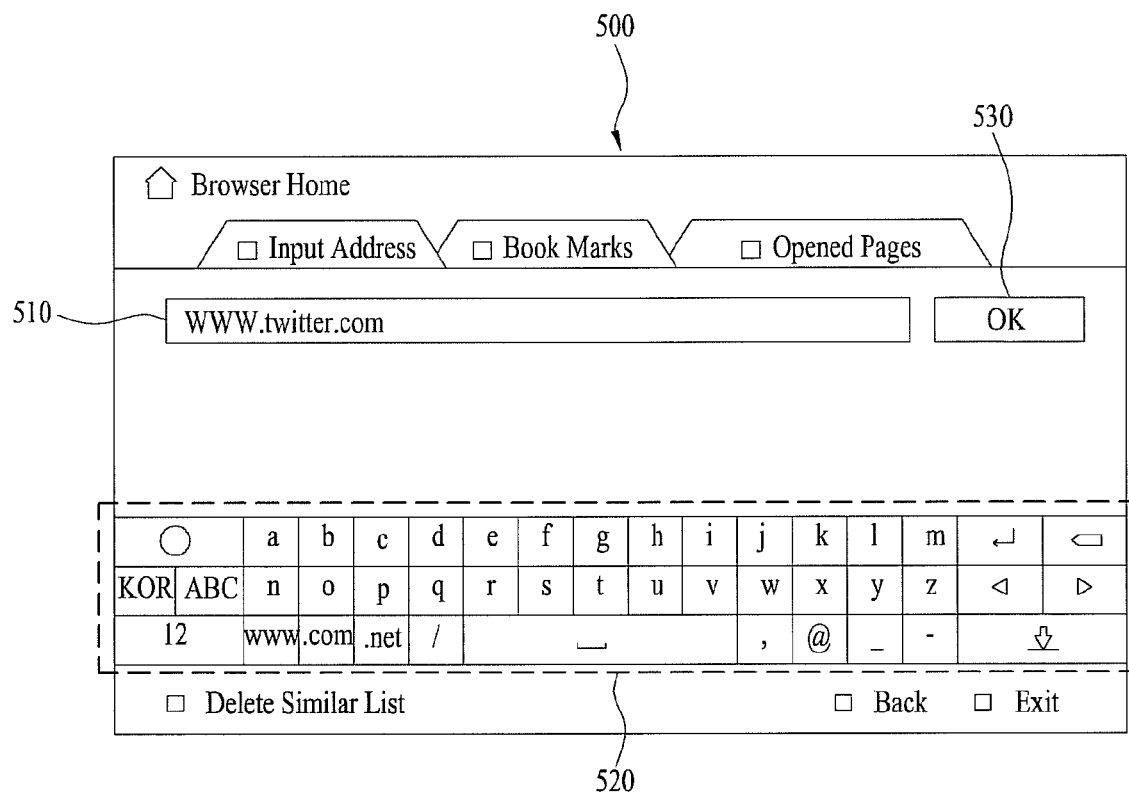
FIG. 5 illustrates a screen on which a Uniform Resource Locator (URL) is to be entered through a browser according to an embodiment of the present invention.

FIG. 5 illustrates a screen on which a URL is entered through a browser according to an embodiment of the present invention.

Referring to FIG. 5, the browser icon 350 illustrated in FIG. 3 is used to launch a browser. A user may take a user action for requesting launching the browser by pressing the browser icon 350.

Upon detecting the user action for pressing the browser icon 350, the controller 190 identifies the user action as a request for launching the browser and thus launches the browser. The display 150 displays an execution screen of the launched browser.

A screen 500 may be displayed as the home screen of the browser. The screen 500 includes an input box 510, a screen keyboard 520, and an OK button 530. The user may enter a URL address by pressing specific keys on the screen keyboard 520. Upon selection of the specific keys on the screen keyboard 520, the values of the specific keys are displayed in the input box 510. The input box 510 is shown as receiving 'www.Twitter.com' in FIG. 5. Upon pressing of the OK button 530 with 'www.Twitter.com' entered, the controller 190 detects a user action for requesting input of the URL and controls connection to the input URL 'www.Twitter.com' in response to the detected user action. Then the controller 190 controls display of a Web page received as a result of the connection on the browser.

Figure 6:
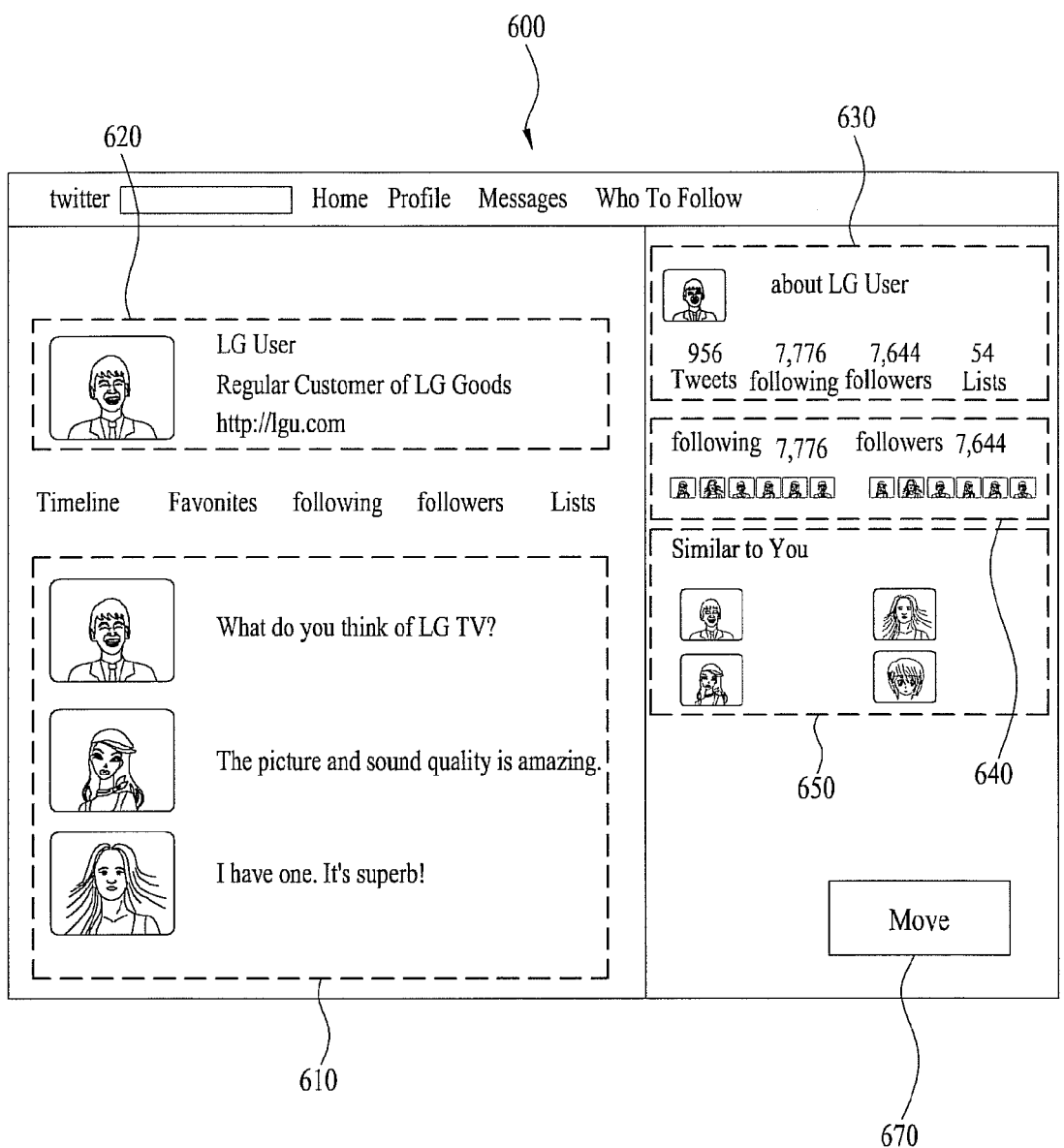
FIG. 6 illustrates a Web page displayed on a browser according to an embodiment of the present invention.

FIG. 6 illustrates a Web page displayed on the browser according to an embodiment of the present invention.

Referring to FIG. 6, a Web page received from 'www.Twitter.com' is displayed on a screen 600. A Move button 670 may further be displayed on the screen 600, in addition to the execution screen of the browser. The Move button 670 may be a GUI for receiving a request for movement to content.

The screen 600 may include a list area 610, a user information area 620, a statistical information area 630, an acquaintance list area 640, and an acquaintance recommend area 650. The list area 610 displays questions from users and acquaintances' answers to the questions. The user information area 620 displays a brief profile of a user. The statistical information area 630 displays statistical information. The acquaintance list area 640 displays followings and followers. The acquaintance recommend area 650 displays those similar to the user.

The screen 600 may be set by a content provider or set and amended on the Web by a user.

FIG. 7 illustrates a link table according to an embodiment of the present invention.

Referring to FIG. 7, a link table 700 may contain content information, URLs, and mapping information that maps the content information to the URLs. The content information may specify at least one of a content name, a location where a content file is stored, or a content version. The mapping information may be a value indicating a row. Since PICASA and www.picasa.com are positioned in a first row in the link table 700, the controller 190 may determine based on row information that a URL associated with PICASA is www.picasa.com.

In an embodiment of the present invention, when content is installed in the display device 20, the name and URL of the content and mapping information that maps the content name to the URL may be added to the link table 700. That is, when content is installed, the controller 190 may add information about the content and a URL of a server from which the content receives information to the link table 700.

In an embodiment of the present invention, a content name and a URL associated with the content name may be entered by the user and the controller 190 may store the received content name and URL in the link table 700.

Figure 8:
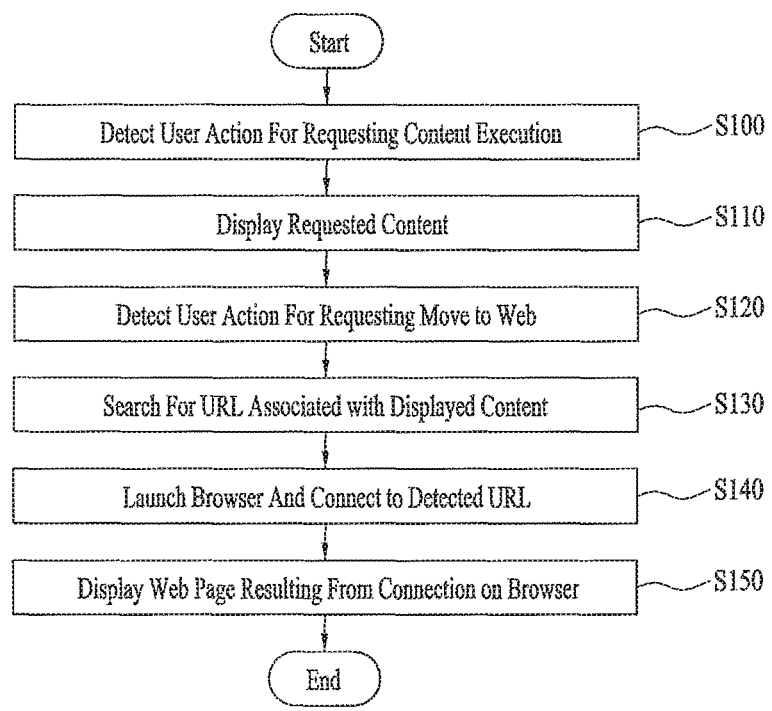
FIG. 8 is a flowchart illustrating an operation for performing a content providing method in the display device according to a preferred embodiment of the present invention.

FIG. 8 is a flowchart illustrating an operation for performing a content providing method in the display device according to a preferred embodiment of the present invention.

Referring to FIG. 8, the controller 190 detects a user action for requesting content execution (S100). The user action may be an action of pressing one of the content icons 311 to 320 illustrated in FIG. 3.

The controller 190 controls display of the requested content in response to the detected user action (S110). The requested content may be represented by the selected content icon. The display 150 may display the screen 400 illustrated in FIG. 4.

The controller 190 detects a user action for requesting move to the Web (S120). This user action may be an action of pressing the Move button 470 illustrated in FIG. 4.

The controller 190 searches for a URL associated with the displayed content in response to the detected user action (S130). The associated URL may be the URL of a Web site of a content provider that provides information to the content.

In an embodiment of the present invention, the controller 190 may search for the associated URL in the displayed content. In another embodiment of the present invention, the controller 190 may detect the associated URL in the link table 700 illustrated in FIG. 7.

The controller 190 launches the browser and connects to the detected URL through the browser (S140).

The controller 190 controls display of a Web page received as a result of the connection on the browser (S150). The display 150 may display the screen 600 illustrated in FIG. 6.

In an embodiment of the present invention, step S130 may precede step S120. In this case, the URL detected in step S130 may be cached and the display device 20 may be connected to the cached URL in step S140. When the URL search precedes step S120, the time taken to display the Web page after detecting the user action for requesting move to the Web can be reduced, thereby shortening a response time for the user action.

Figure 9:
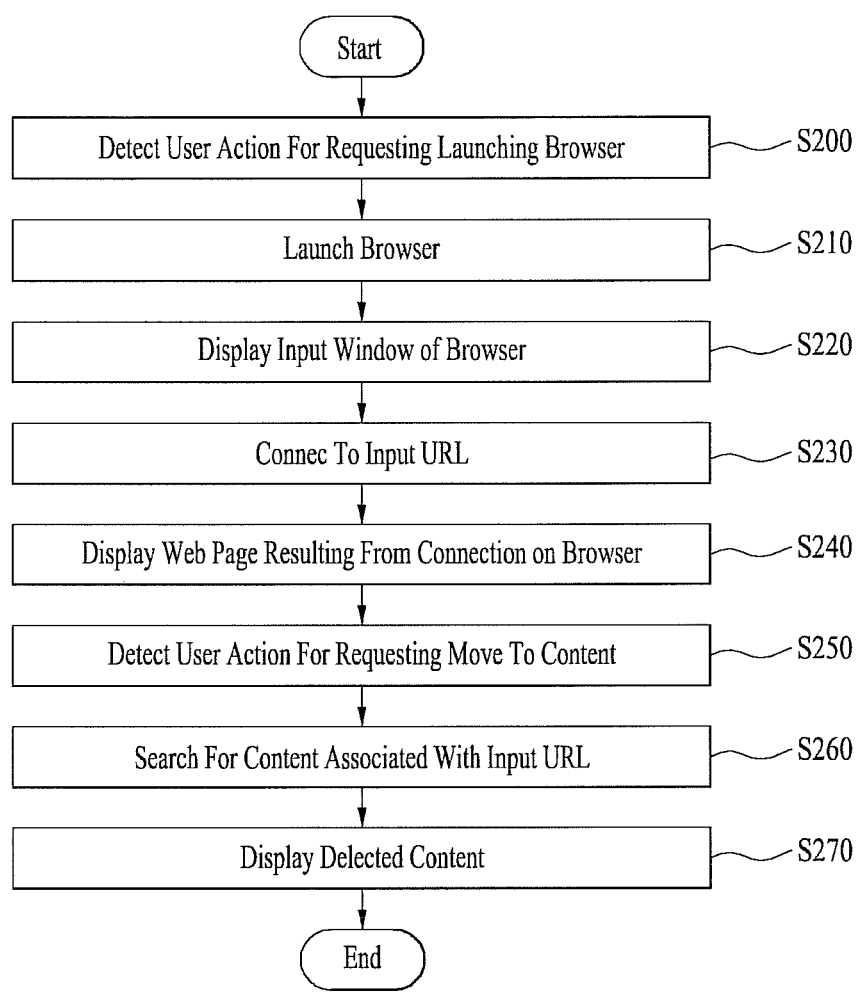
FIG. 9 is a flowchart illustrating an operation for performing the content providing method in the display device according to another preferred embodiment of the present invention.

FIG. 9 is a flowchart illustrating an operation for performing the content providing method in the display device according to another preferred embodiment of the present invention.

Referring to FIG. 9, the controller 190 detects a user action for requesting launching the browser (S200). The user action may be an action of pressing the browser icon 350 illustrated in FIG. 3.

The controller 190 launches the browser in response to the detected user action (S210).

The display 150 displays an input window of the launched browser (S220). The display 150 may display the screen 500 illustrated in FIG. 5. Upon detection of input of a URL, the controller 190 may perform step S230. For example, upon detecting a user's pressing the OK button 530, the controller 190 may determine that a URL has been input.

The controller 190 connects to the input URL through the browser (S230). The URL may a URL displayed in the input box 510, a URL selected from URLs listed in a bookmarks page, or a URL listed in an opened page list.

The controller 190 displays a Web page received as a result of the connection on the browser (S240). The display 150 may display the screen 600 illustrated in FIG. 6.

The controller 190 detects a user action for requesting move to content (S250). The user action may be an action of pressing the Move button 670 illustrated in FIG. 6.

The controller 190 searches for content associated with a Web site that provides the Web page displayed on the browser (S260). The associated content may be a dedicated application for receiving information from the Web site.

In an embodiment of the present invention, the controller 190 may detect a URL indicated by the browser and search for content associated with the detected URL. Herein, the controller 190 may search for the content associated with the detected URL in the link table 700 illustrated in FIG. 7.

The controller 190 controls display of the detected content (S270). For example, the display 150 may display the screen 400 illustrated in FIG. 4.

In an embodiment of the present invention, step S260 may precede step S250. In this case, information indicating content detected in step S160 may be cached and content indicated by the cached information may be executed immediately in step S270. When the content search precedes step S250, the time taken to display the content after detecting the user action for requesting move to the content can be reduced, thereby shortening a response time for the user action.

FIGS. 10A and 10B illustrate screens that display content and a browser simultaneously.

Referring to FIGS. 10A and 10B, a screen 1010 displays content 1011 and a browser 1012 simultaneously. The user may take a user action for reflecting a function supported by a Web page of the browser 1012 in the content 1011. The controller 190 may detect the user action and thus may update the content 1011 in response to the detected user action so that the function supported by the Web page is reflected in the content 1011.

The user may select an area in which the function to be reflected in the content is displayed on the displayed Web page of the browser 1012 and drag the selected area. In FIG. 10A, the acquaintance list area 640 is selected and dragged in correspondence with movement of a pointer 1001. An image 1040 is a dragged version of the acquaintance list area 640.

The user may move a pointer 1001' over content 1021 and drop the function 1040 dragged from a browser 1022 on the content 1021. Upon detecting a user action for dropping the dragged function 1040, the controller 190 identifies the user action as a request for reflecting a function of a Web page in content. The dropped area 1040' may be an area in which the function 1040 will be displayed.

The controller 190 may obtain information about the position of the area 1040' and information about the function 1040 and may update the content 1021 with the obtained position information and function information. That is, the controller 190 may generates program code to be added to the program code of the content 1021 based on the obtained position information and function information and may add the generated program code to the program code of the content 1021. The generated program code is used to display the function at the position indicated by the position information on an execution screen of the content 1021.

Figure 11:
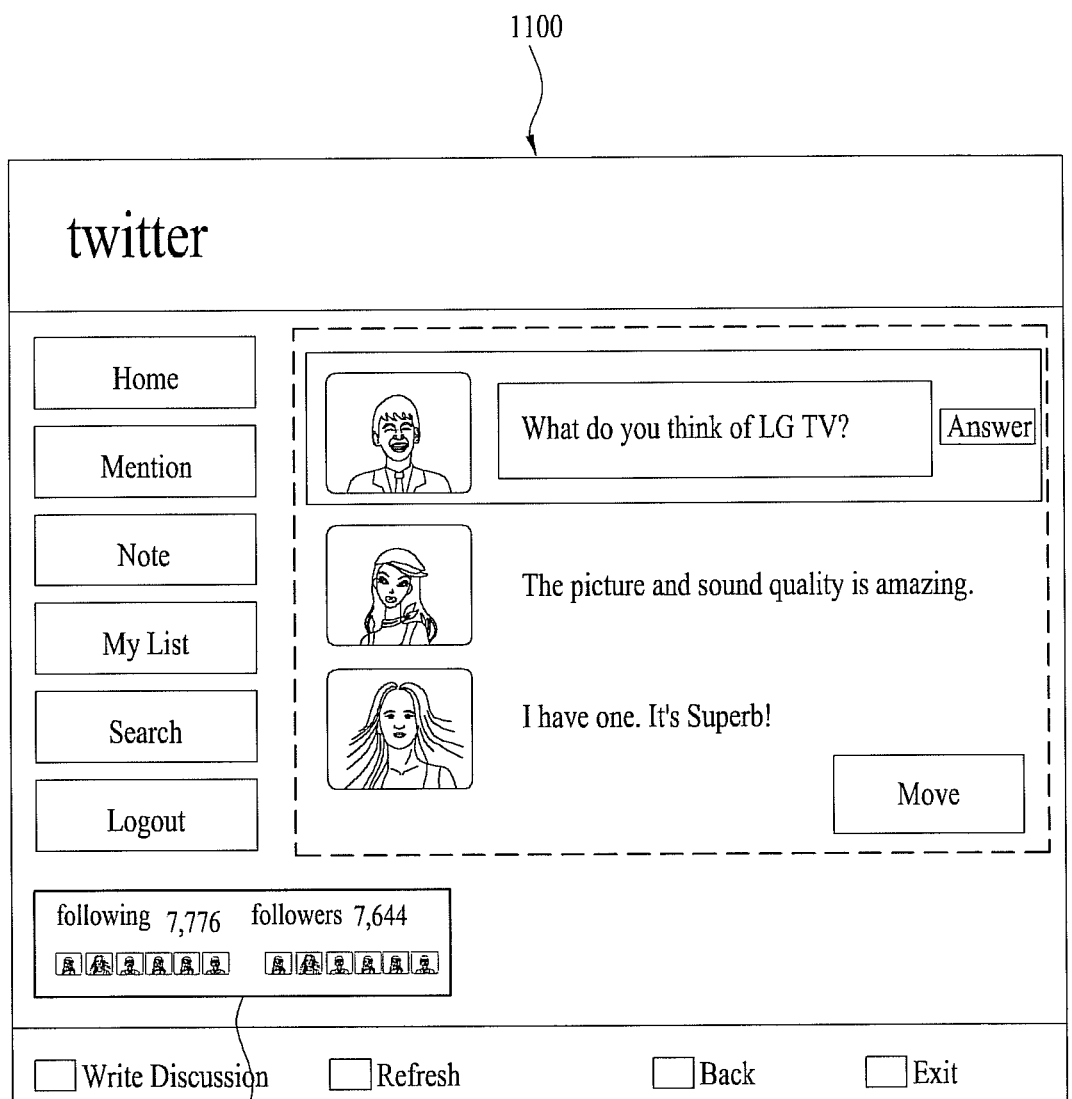
FIG. 11 illustrates a screen that displays content reflecting a function supported by a Web page according to an embodiment of the present invention.

FIG. 11 illustrates a screen that displays content reflecting a function supported by a Web page according to an embodiment of the present invention.

Figure 10:
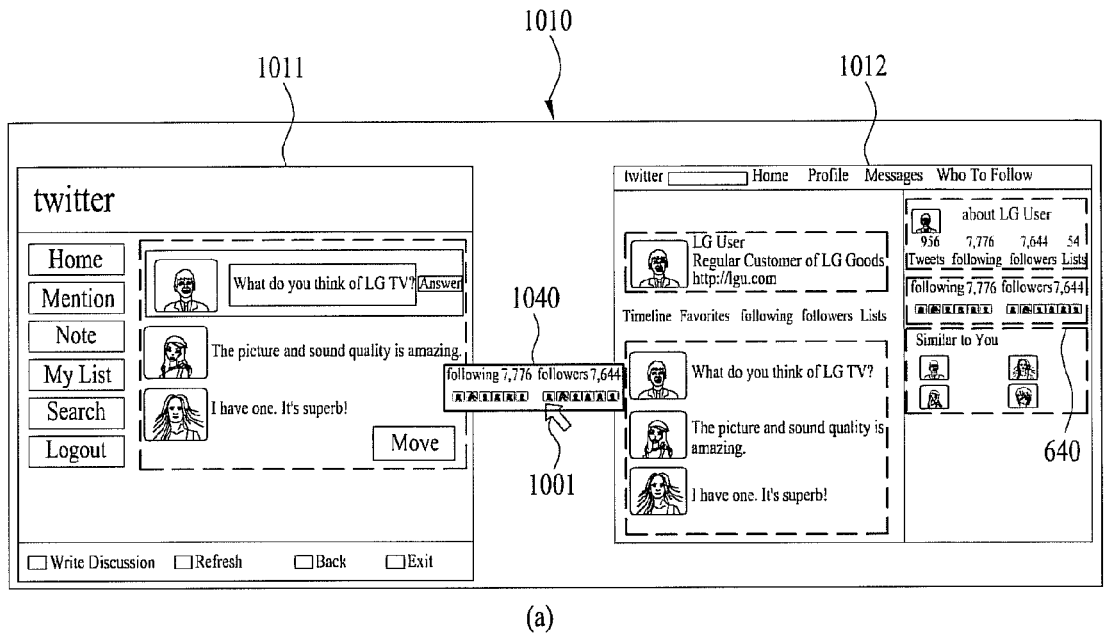
FIGS. 10A and 10B illustrate screens that display content and a browser simultaneously.
Figure 10:
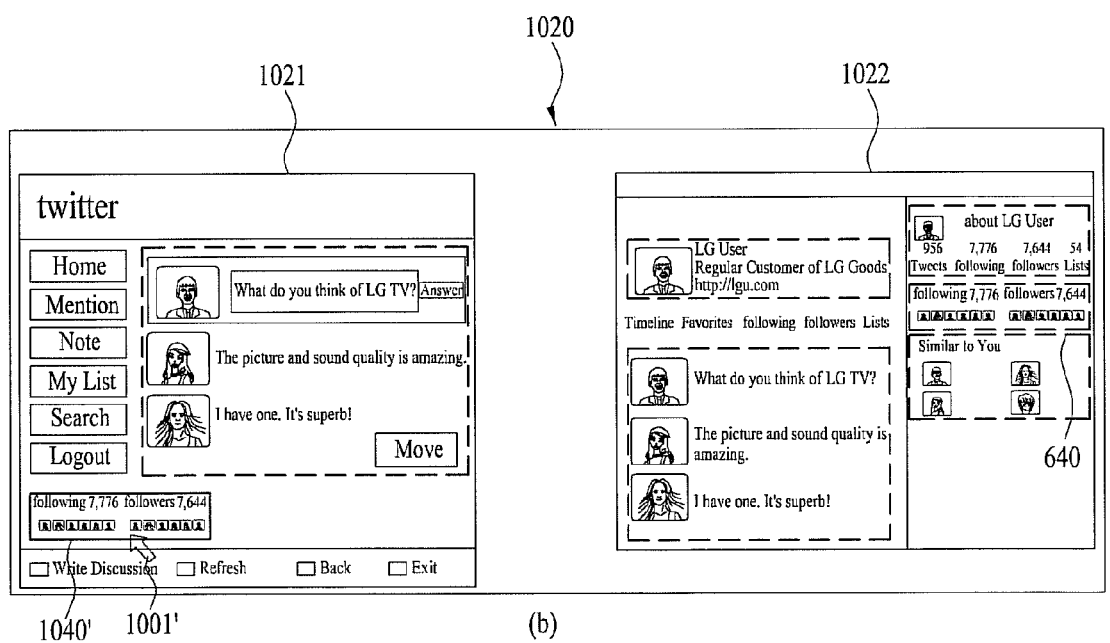

Referring to FIG. 11, a screen 1100 displays an execution screen of the updated content illustrated in FIG. 10. The function 640 of the Web page added to the content 1021 in FIG. 10 is displayed in the area 1140.

Figure 12:
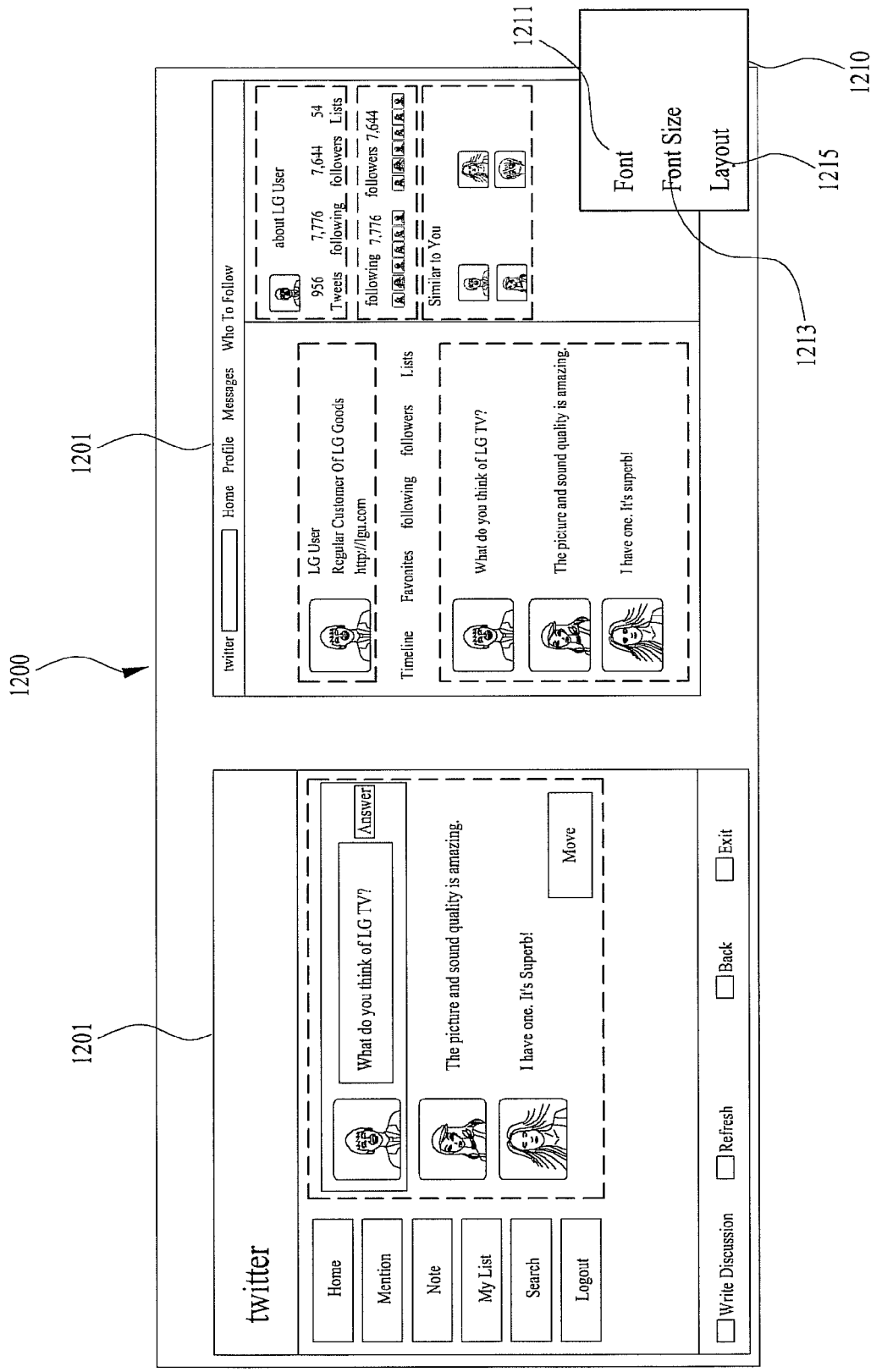
FIG. 12 illustrates a menu for reflecting settings of a Web page according to an embodiment of the present invention.

FIG. 12 illustrates a menu for reflecting settings of a Web page according to an embodiment of the present invention.

Referring to FIG. 12, a screen 1200 displays content 1201, a browser 1202, and a setting menu 1210. Upon detecting a user action for requesting a setting menu, the controller 190 may control display of the setting menu 1210 in response to the detected user action.

The setting menu 1210 may include a font menu item 1211, a font size menu item 1213, and a layout menu item 1215. The user may take a user action for requesting reflecting a setting of a Web page displayed on the browser in content by selecting a menu item from the setting menu 1210. The settings of a Web page may cover font setting, font size setting, and screen layout setting of the Web page.

Upon detecting a user action for selecting the font menu item 1211, the controller 190 obtains font information of the Web page in response to the detected user action and updates the content 1201 based on the obtained font information. Specifically, the controller 190 may amend a part associated with font information in the program code of the content 1201 based on the obtained font information.

Upon detecting a user action for selecting the font size menu item 1213, the controller 190 obtains font size information of the Web page in response to the detected user action and updates the content 1201 based on the obtained font size information. Specifically, the controller 190 may amend a part associated with font size information in the program code of the content 1201 based on the obtained font size information.

Upon detecting a user action for selecting the layout menu item 1215, the controller 190 obtains layout information of the Web page in response to the detected user action and updates the content 1201 based on the obtained layout information. Specifically, the controller 190 may amend a part associated with layout information in the program code of the content 1201 based on the obtained layout information.

Figure 13:
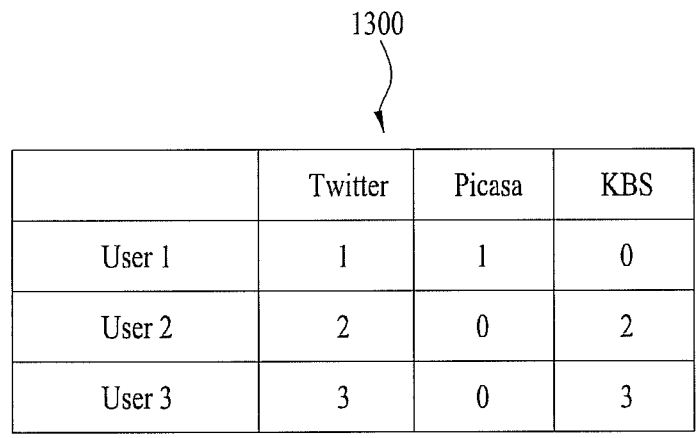
FIG. 13 illustrates a content version management table for managing a content list on a user basis.

FIG. 13 illustrates a content version management table for managing a content list on a user basis.

Referring to FIG. 13, a content version management table 1300 includes user information, content version information, and mapping information that maps the user information to the content version information. The user information may specify at least one of a user name or a user Identifier (ID). The controller 190 may identify the version of the TWITTER content for User 1 as 1. The mapping information may be a value indicating a row and column that maps User 1 to the content version information.

When content is updated, the controller 190 may add user information about a currently logged-on user and information about the version of the updated content to the content version management table 1300. In addition, the controller 190 may add mapping information that maps the user information to the version information to the content version management table 1300.

Figure 14:
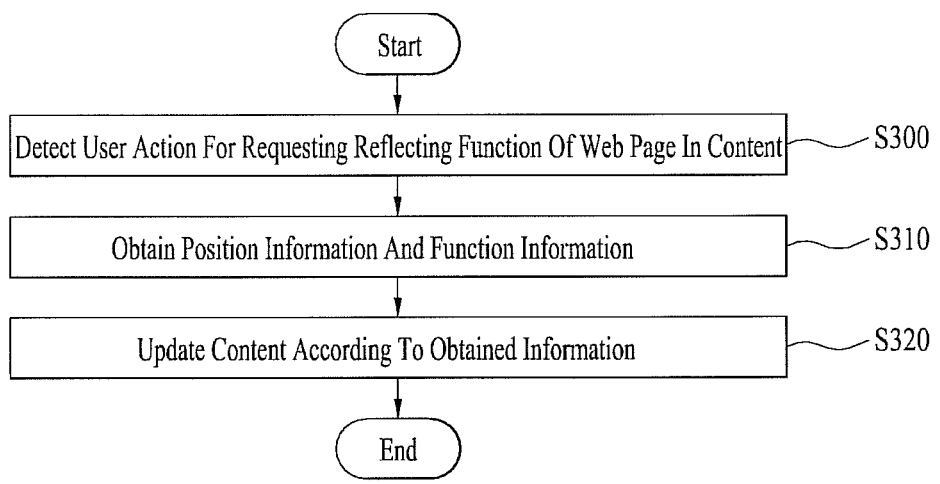
FIG. 14 is a flowchart illustrating an operation for performing the content providing method in the display device according to another preferred embodiment of the present invention.

FIG. 14 is a flowchart illustrating an operation for performing the content providing method in the display device according to another preferred embodiment of the present invention.

Referring to FIG. 14, the controller 190 detects a user action for requesting reflecting a function supported by a Web page in content (S300). The user action may be taken in the manner described with reference to FIGS. 10A and 10B.

The controller 190 obtains information about a position at which a function is to be displayed and information about the function (S310). Specifically, the controller 190 may identify the area 1040' on which the dragged function 1040 has been dropped and may obtain information about the position of the area 1040' as the position information about an area in which the function will be displayed. The controller 190 may further obtain function information from the source code of the Web page having the area 640 in order to provide the function.

The controller 190 updates the content using the obtained information (S320). Specifically, the controller 190 may generate program code based on the obtained position information and function information and add the generated program code to the program code of the content. The generated program code is used to display the function at the position indicated by the position information on an execution screen of the content.

In addition, the controller 190 may add information about a user currently logged on to the display device 20 and information about the version of the updated content to the content version management table 1300. The controller 190 may also add mapping information that maps the user information to the version information to the content version management table 1300.

Figure 15:
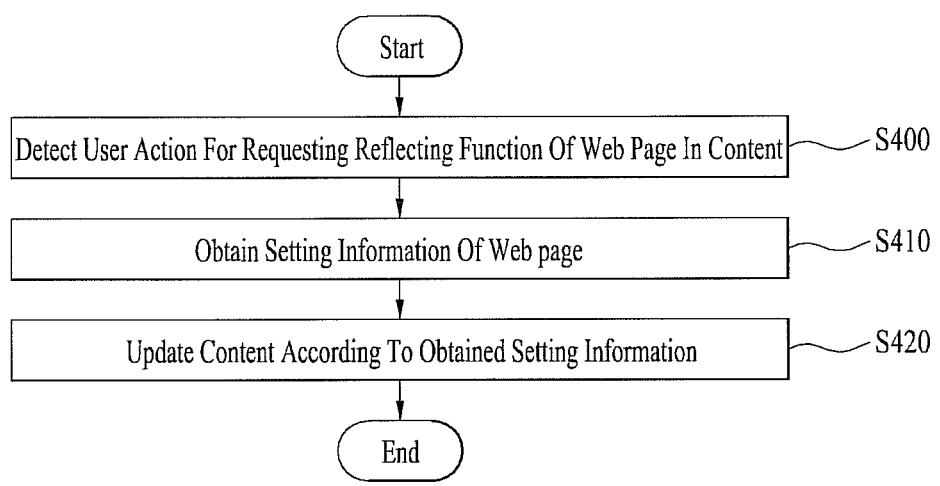
FIG. 15 is a flowchart illustrating an operation for performing the content providing method in the display device according to another preferred embodiment of the present invention.

FIG. 15 is a flowchart illustrating an operation for performing the content providing method in the display device according to another preferred embodiment of the present invention.

Referring to FIG. 15, the controller 190 detects a user action for requesting reflecting settings of a Web page in content (S400). The user action may be taken in the manner described with reference to FIG. 12.

The controller 190 obtains setting information, i.e. information about the settings of the Web page (S410). The controller 190 may obtain the setting information from the source code of the Web page or a Web site that provides the Web page. To receive the setting information from the Web site, the controller 190 may transmit a signal requesting the setting information to the Web site. The setting information may specify at least one of the font, font size, or layout of the Web page.

The controller 190 updates the content based on the obtained setting information (S420). Specifically, the controller 190 may amend a part associated with setting information in the program code of the content based on the setting information obtained in step S410.

In addition, the controller 190 may add information about a user currently logged on to the display device 20 and information about the version of the updated content to the content version management table 1300. The controller 190 may also add mapping information that maps the user information to the version information to the content version management table 1300.

Figure 16:
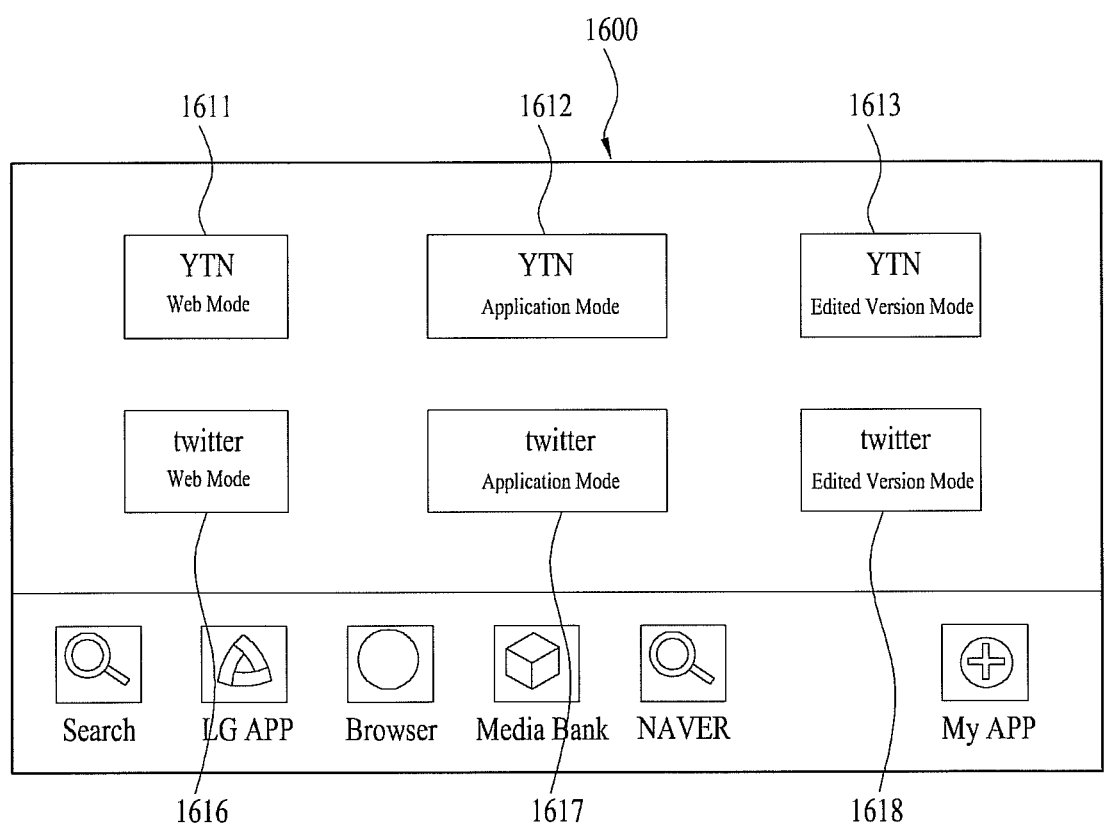
FIG. 16 illustrates a screen that displays a content list according to another embodiment of the present invention.

FIG. 16 illustrates a screen that displays a content list according to another embodiment of the present invention.

Referring to FIG. 16, the display 150 may display a screen 1600. In an embodiment of the present invention, the screen 1600 may be a background screen of the display device 20. Upon detecting a user action for requesting display of a content list, the controller 190 may control display of the screen 1600 in response to the detected user action in an embodiment of the present invention.

The screen 1600 displays content icons 1611, 1612, 1613, 1616, 1617 and 1618 that represent content in different execution modes. The user may take a user action for requesting execution of content in an execution mode indicated by a content icon representing the content by pressing the content icon.

For instance, the content icons 1611, 1612 and 1613 represent the same content, YTN in different execution modes. Specifically, the content icon 1611 indicates Web mode, the content icon 1612 indicates application mode, and the content icon 1613 indicates edited version mode. Upon detecting a user action for selecting the content icon 1611, the controller 190 controls execution of the content, YTN in the Web mode in response to the detected user action. Upon detecting a user action for selecting the content icon 1612, the controller 190 controls execution of the content, YTN in the application mode in response to the detected user action. Upon detecting a user action for selecting the content icon 1613, the controller 190 controls execution of the content, YTN in the edited version mode in response to the detected user action.

Figure 17:
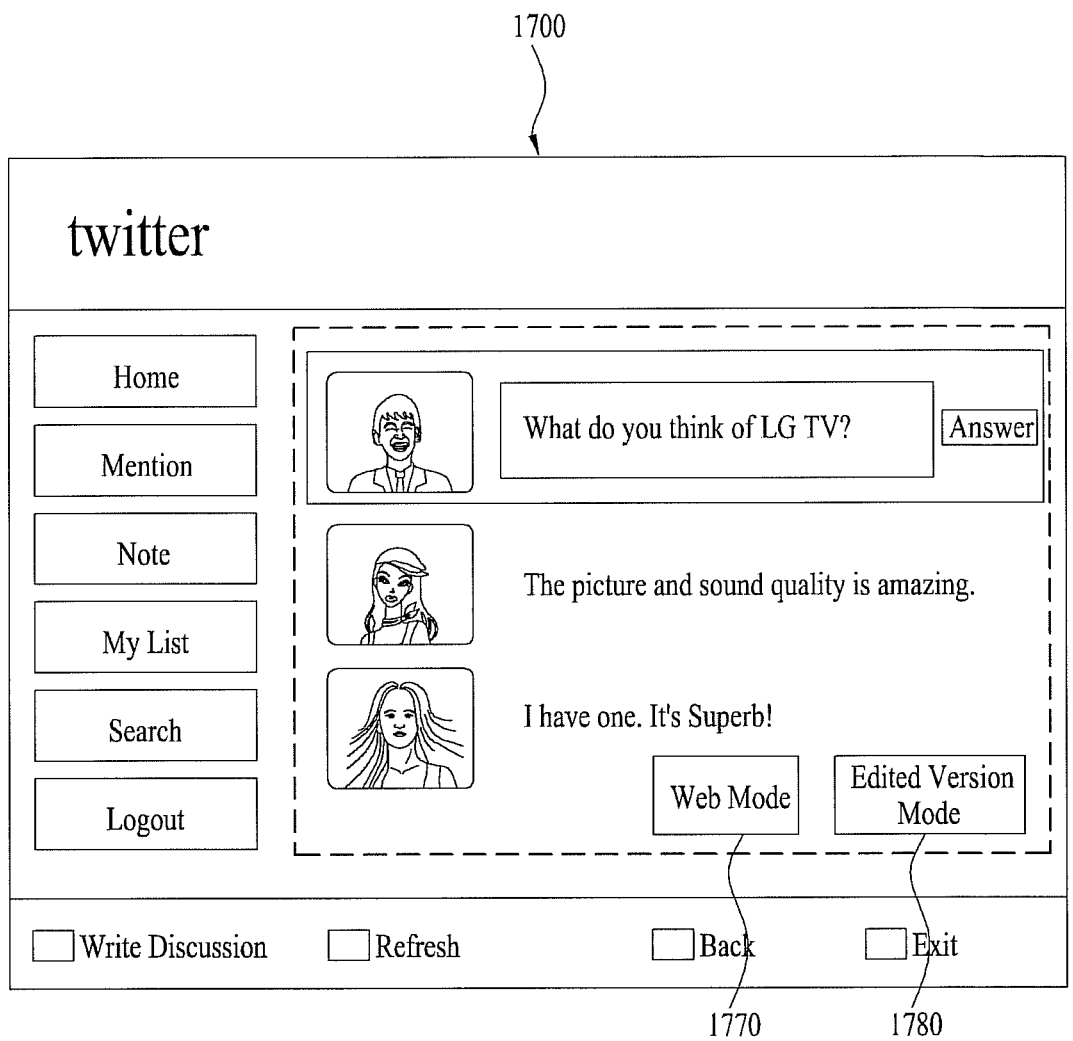
FIG. 17 illustrates a screen that displays content in application mode according to an embodiment of the present invention.

FIG. 17 illustrates a screen that displays content in the application mode according to an embodiment of the present invention.

Referring to FIG. 17, a screen 1700 is an execution screen of content, TWITTER in the application mode. The controller 190 may detect a user action for selecting the content icon 1617 and control display of the screen 1700 in response to the detected user action. The controller 190 may also detect a user action for selecting a menu item 1870 illustrated in FIG. 18 or a menu item 1910 illustrated in FIG. 19 and control display of the screen 1700 in response to the detected user action.

The screen 1700 includes a menu item 1770 indicating the Web mode and a menu item 1780 indicating the edited version mode. The menu items 1770 and 1780 may be displayed in the form of selectable icons. In addition, the screen 1700 may be configured by replacing the Move button 470 on the screen 400 of FIG. 4 with the menu items 1770 and 1780 and the menu item 1770 functions as the Move button 470.

Upon detecting a user action for selecting the menu item 1770, the controller 190 may execute TWITTER in the Web mode in response to the detected user action. The screen 600 of FIG. 6 or a screen 1800 of FIG. 18 may be displayed as an execution screen of the content, TWITTER in the Web mode.

Upon detecting a user action for selecting the menu item 1780, the controller 190 may execute TWITTER in the edited version mode in response to the detected user action. A screen 1100 of FIG. 11 or a screen 1900 of FIG. 19 may be displayed as an execution screen of the content, TWITTER in the edited version mode.

Figure 18:
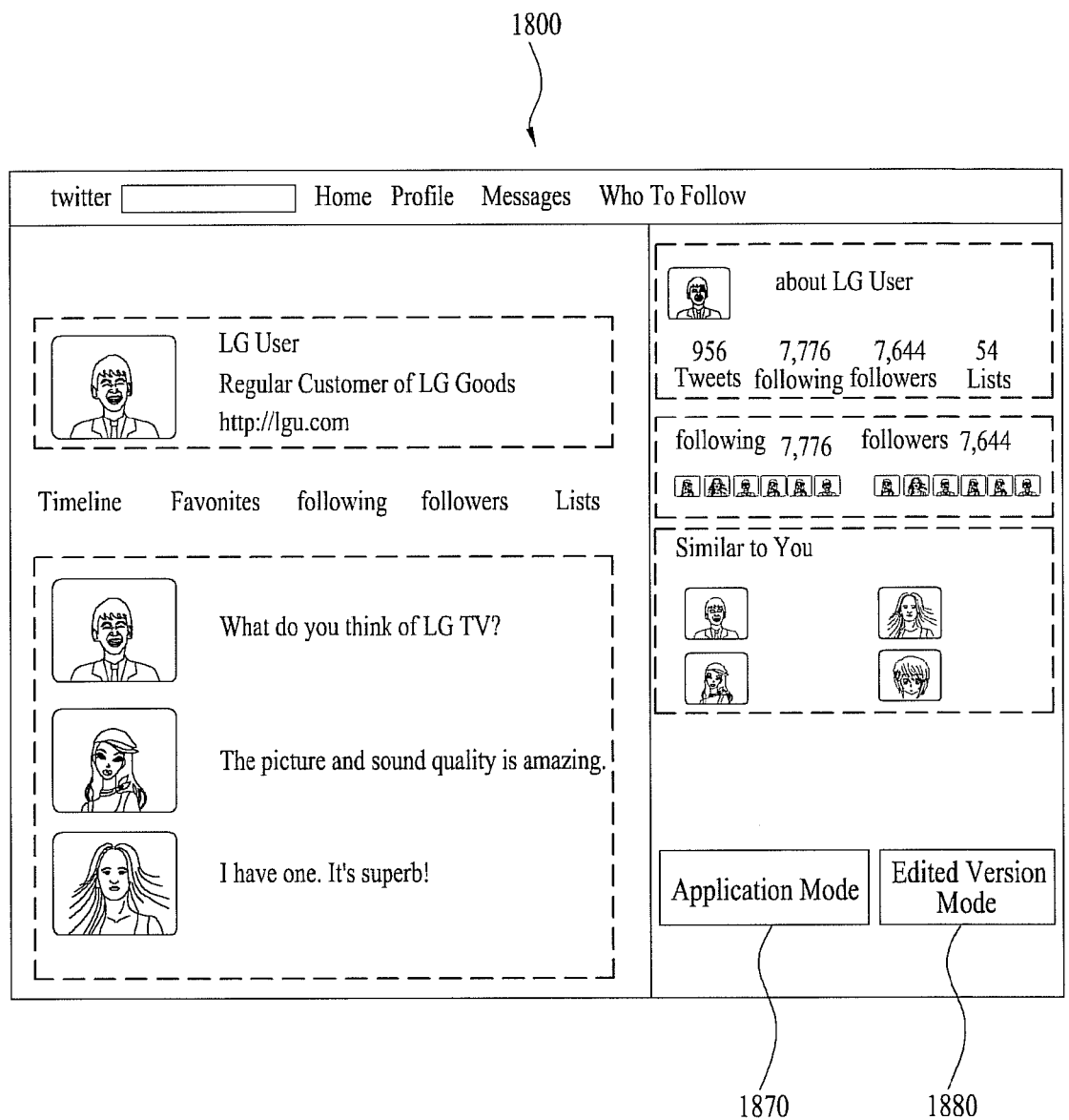
FIG. 18 illustrates a screen that displays content in Web mode according to an embodiment of the present invention.

FIG. 18 illustrates a screen that displays content in the Web mode according to an embodiment of the present invention.

Referring to FIG. 18, the screen 1800 is an execution screen of content, TWITTER in the Web mode. The controller 190 may detect a user action for selecting the content icon 1616 and control display of the screen 1800 in response to the detected user action. The controller 190 may also detect a user action for selecting the menu item 1770 of FIG. 17 or a menu item 1920 of FIG. 19 and control display of the screen 1800 in response to the detected user action.

The screen 1800 includes the menu item 1870 indicating the application mode and a menu item 1880 indicating the edited version mode. The menu items 1870 and 1880 may be displayed in the form of selectable icons. In addition, the screen 1800 may be configured by replacing the Move button 670 in the screen 600 of FIG. 6 with the menu items 1870 and 1880 and the menu item 1870 functions as the Move button 670.

Upon detecting a user action for selecting the menu item 1870, the controller 190 may execute TWITTER in the application mode in response to the detected user action. The screen 400 illustrated in FIG. 4 or the screen 1700 illustrated in FIG. 17 may be displayed as the execution screen of the content, TWITTER in the application mode.

Upon detecting a user action for selecting the menu item 1880, the controller 190 may execute TWITTER in the edited version mode in response to the detected user action. The screen 1100 illustrated in FIG. 11 or the screen 1900 illustrated in FIG. 19 may be displayed as the execution screen of the content, TWITTER in the edited version mode.

Figure 19:
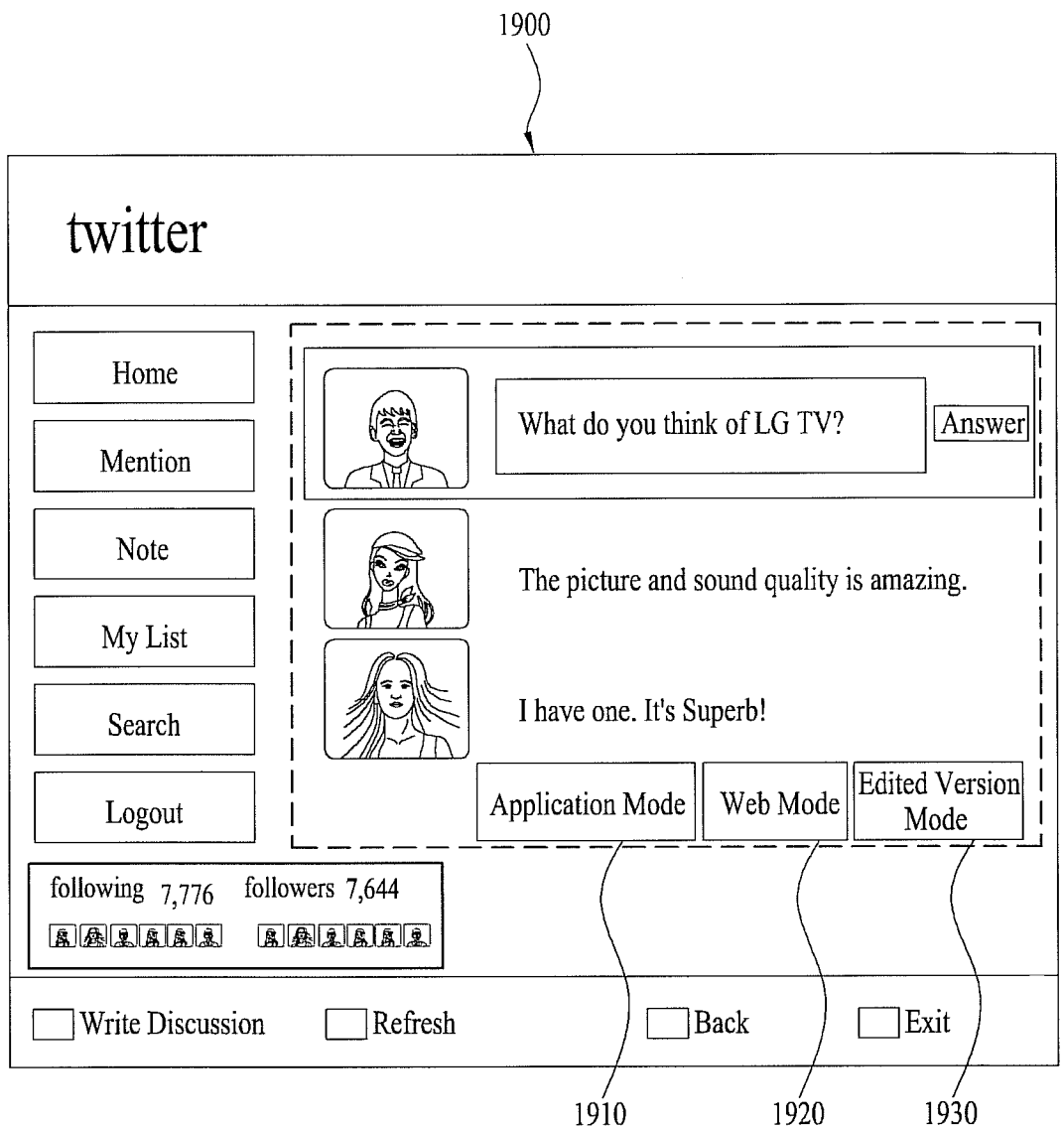
FIG. 19 illustrates a screen that displays content in edited version mode according to an embodiment of the present invention.

FIG. 19 illustrates a screen that displays content in the edited version mode according to an embodiment of the present invention.

Referring to FIG. 19, the screen 1900 is the execution screen of content, TWITTER in the edited version mode. The controller 190 may detect a user action for selecting the content icon 1618 and control display of the screen 1900 in response to the detected user action. The controller 190 may also detect a user action for selecting the menu item 1780 illustrated in FIG. 17 or the menu item 1880 illustrated in FIG. 18 and control display of the screen 1900 in response to the detected user action.

The screen 1900 includes the menu item 1910 indicating the application mode, the menu item 1920 indicating the Web mode, and a menu item 1930 indicating edit mode. The menu items 1910, 1920 and 1930 may be displayed in the form of selectable icons. The edit mode is an operation mode of a display device, in which content can be edited. In addition, the screen 1900 may be configured by replacing a Move button in the screen 1100 of FIG. 11 with the menu items 1910, 1920 and 1930 and the menu item 1920 functions as the Move button.

Upon detecting a user action for selecting the menu item 1910, the controller 190 may execute TWITTER in the application mode in response to the detected user action. The screen 400 of FIG. 4 or the screen 1700 of FIG. 17 may be displayed as the execution screen of the content, TWITTER in the application mode.

Upon detecting a user action for selecting the menu item 1920, the controller 190 may execute TWITTER in the Web mode in response to the detected user action. The screen 600 of FIG. 6 or the screen 1800 of FIG. 18 may be displayed as the execution screen of the content, TWITTER in the Web mode.

Upon detecting a user action for selecting the menu item 1930, the controller 190 may execute TWITTER in the edit mode and display an edit screen for editing the content TWITTER in response to the detected user action. The screen 1010 of FIG. 10A, the screen 1020 of FIG. 10B, the screen 1200 of FIG. 12, or a screen 2000 of FIG. 20 may be displayed as the edit screen of the content, TWITTER.

Figure 20:
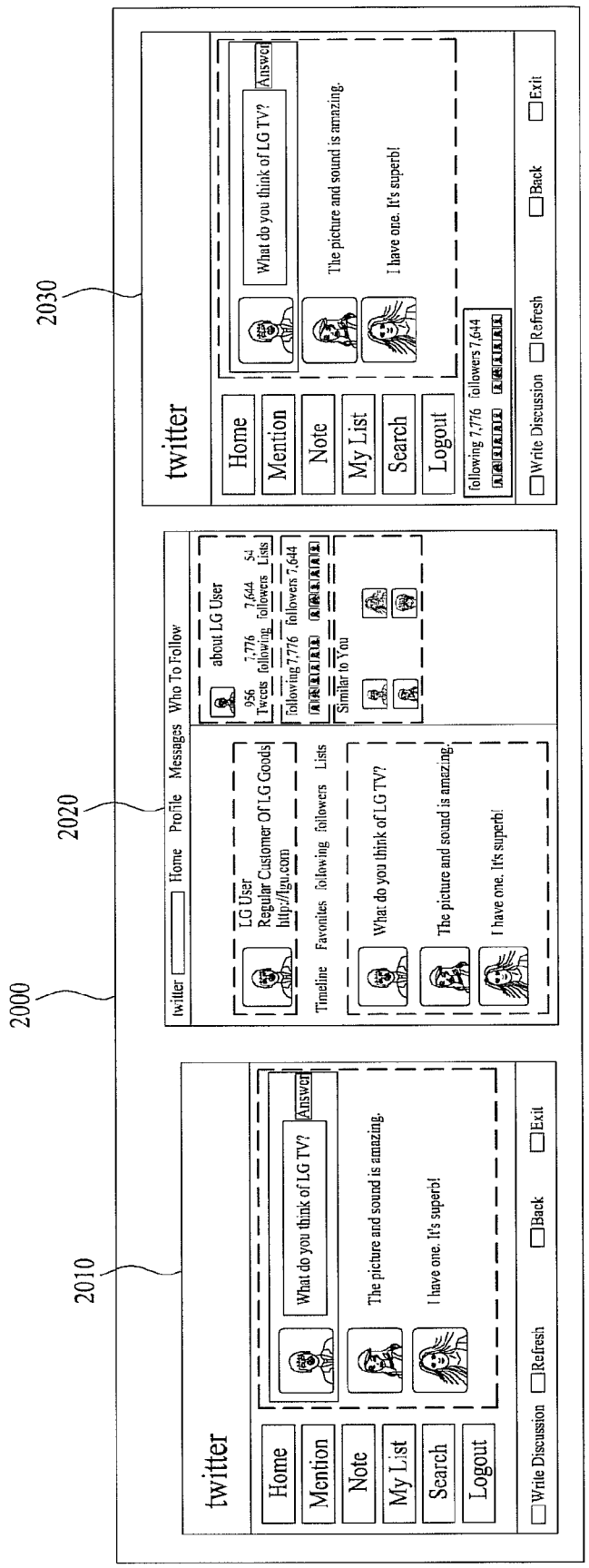
FIG. 20 illustrates a screen that displays content in different execution modes according to an embodiment of the present invention.

FIG. 20 illustrates a screen that displays content in different execution modes according to an embodiment of the present invention.

Referring to FIG. 20, the screen 2000 displays execution screens 2010, 2020 and 2030 corresponding to different execution modes. Upon detecting a user action for selecting the menu item 1930 illustrated in FIG. 19, the controller 190 may control display of the screen 2000 in response to the detected user action.

The execution screen 2010 is for TWITTER executed in the application mode, corresponding to the screen 400 of FIG. 4 or the screen 1700 of FIG. 17. The execution screen 2020 is for TWITTER executed in the Web mode, corresponding to the screen 600 of FIG. 6 or the screen 1800 of FIG. 18. The execution screen 2030 is for TWITTER executed in the edited version mode, corresponding to the screen 1100 of FIG. 11 or the screen 1900 of FIG. 19.

On the screen 2000, the execution screen 2030 may be edited in the manner described before with reference to FIGS. 10A and 10B. That is, when the user drags an area that displays a specific function from the execution screen 2020 and then drops it on the execution screen 2030, the controller 190 edits the application in such a manner that the specific function is displayed in an area where the dragged area has been dropped. The controller 190 updates a content list stored in the memory 180 to reflect information about the edited application.

Figure 21:
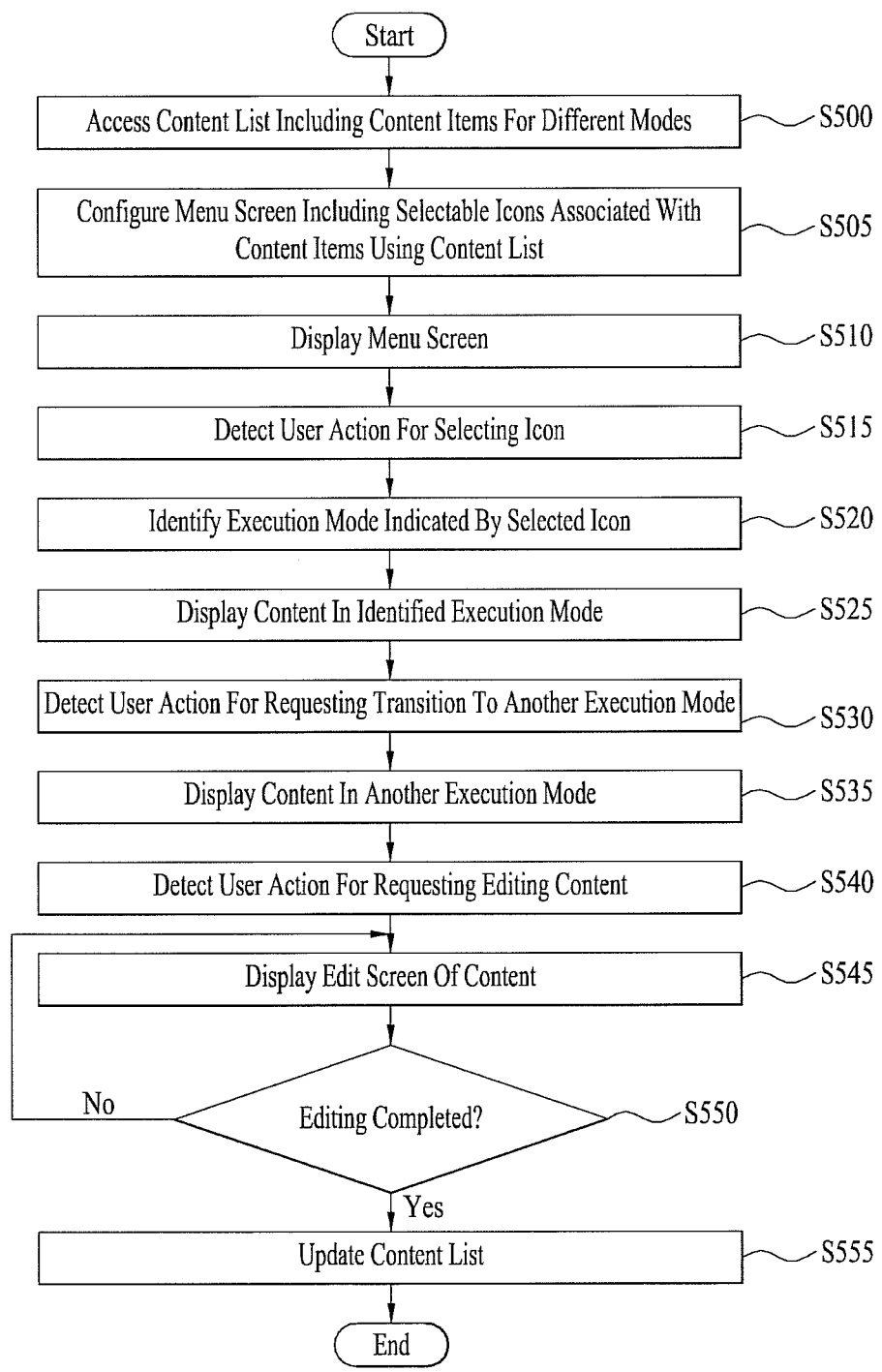
FIG. 21 is a flowchart illustrating an operation for performing the content providing method in the display device according to a further preferred embodiment of the present invention.

FIG. 21 is a flowchart illustrating an operation for performing the content providing method in the display device according to a further preferred embodiment of the present invention.

Referring to FIG. 21, the controller 190 accesses a memory area having a content list listing content items according to execution modes (S500). The content list may be stored in the memory 180. For the same content, the content list may include an item associated with a Web version, an item associated with an application version, and an item associated with an edited version.

The controller 190 configures a menu screen including selectable icons associated with the items based on the accessed content list (S505). The icons may be the content icons 1611, 1612, 1613, 1616, 1617 and 1618 illustrated in FIG. 16.

The display 150 displays the configured menu screen (S510). The display 150 may display the screen 1600 of FIG. 16 as the menu screen.

The controller 190 detects a user action for selecting an icon displayed on the menu screen (S515).

The controller 190 identifies the execution mode indicated by the selected icon in response to the detected user action (S520). The execution mode may be one of the application mode, the Web mode, and the edited version mode.

The controller 190 controls display of the content in the identified execution mode (S525). In the case of the application mode, the display 150 may display the screen 400 of FIG. 4 or the screen 1700 of FIG. 17. In the case of the Web mode, the display 150 may display the screen 600 of FIG. 6 or the screen 1800 of FIG. 18. In the case of the edited version mode, the display 150 may display the screen 1100 of FIG. 11 or the screen 1900 of FIG. 19.

The controller 190 detects a user action for requesting transition to another execution mode (S530). The user action may be one of an action of pressing the Move button 470 on the screen 400 of FIG. 4, an action of pressing the Move button 670 on the screen 600 of FIG. 6, an action of pressing the Move button on the screen 1100 of FIG. 11, an action of pressing the menu item 1770 or 1780 on the screen 1700 of FIG. 17, an action of pressing the menu item 1870 or 1880 on the screen 1800 of FIG. 18, and an action of pressing the menu item 1910 or 1920 on the screen 1900 of FIG. 19.

The controller 190 controls display of the content in the requested another execution mode (S535). Step S535 may include steps S130, S140, and S150 illustrated in FIG. 8 and step S530 may correspond to step S120. Step S535 may include steps S260 and S270 of FIG. 9 and step S530 may correspond to step S250.

The controller 190 detects a user action for requesting editing content (S540). The user action may be an action of pressing the menu item 1930 on the screen 1900 of FIG. 19.

The controller 190 controls display of a screen on which to edit the content in response to the detected user action (S545). The display 150 may display one of the screen 1010 illustrated in FIG. 10A, the screen 1200 illustrated in FIG. 12, and the screen 2000 illustrated in FIG. 20.

The controller 190 determines whether the content has been completely edited (S550). The content providing method illustrated in FIG. 21 may include the operation of FIG. 14 or FIG. 15.

Upon completion of the content editing, the controller 190 updates a content list stored in the memory 180 to reflect information about the edited content (S555). The edited content may be an edited version of an application.

As is apparent from the above description of the display device and the method for providing content in the display device according to the present invention, since a URL associated with an executed application is detected and the display device is connected to the URL through a browser, a user can rapidly view a Web page associated with the executed application without the need for launching the browser additionally and entering the URL. In addition, an application associated with a Web page displayed on the browser is detected and executed in the present invention. Thus, the user can rapidly view an execution screen of the application associated with the displayed Web page without the need for searching for the application in a content list and executing the detected application. Furthermore, the present invention can provide content received from a content provider in various modes because icons representing different execution modes are given for the same content and thus the content is provided in a selected execution mode.

The present invention may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for processing data in a digital device, the method comprising:
    displaying a broadcast program on a screen;

receiving, during the display of the broadcast program on the screen, a first user action requesting display of content in an application mode, wherein the application mode displays the content in a dedicated application;

displaying the application associated with the application mode of the content in response to the received first user action on the screen;

receiving a second user action, after the first user action, requesting to switch the displayed application into a web mode for displaying the content as a web page in a web browser;

displaying the content in the web browser on the screen in response to the received second user action, receiving a third user action, after the second user action, requesting to switch the displayed content in the web browser into the application mode;

displaying the application associated with the application mode for the content on the screen in response to the received third user action; and wherein the application mode includes a first menu item for switching to the web mode and the web mode includes a second menu item for switching to the application mode.

2. The method according to claim 1, wherein the content is collected from a pre-stored application.

3. The method according to claim 1, wherein the content is identical to a content provider connected through a Uniform Resource Locator (URL).

4. The method according to claim 1, wherein the application mode and the web mode are displayed based on information on a logged-on user.

5. The method according to claim 1, further comprising:
receiving a fourth user action for requesting a function of the web page of the content to be applied to the application of the content; and updating the displayed application of the content by applying the function of the web page of the content in response to the received user action for requesting the function of the web page of the content to be applied to the application of the content.

6. The method according to claim 5, wherein the updating of the application of the content comprises:
obtaining position information indicating a position at which the function of the web page of the content is displayed and function information for providing the function of the web page of the content; and updating the displayed application of the content based on the obtained position information and the obtained function information.

7. The method according to claim 1, further comprising:
receiving a fourth user action for requesting a setting of the web page of the content to be applied to the application of the content; and updating the displayed application of the content by applying the setting of the web page of the content in response to the received user action for requesting the setting of the web page of the content to be applied to the application of the content.

8. The method according to claim 1, wherein the second user action is received by accessing the menu item displayed on an area of the screen.

9. A digital television comprising:
a processor and a screen configured to:
receive a broadcast signal;
display the broadcast program on the screen;

receive, during the display of the broadcast program, a first user action requesting display of content in an application mode, wherein the application mode displays the content in a dedicated application;

display the application associated with the application mode of the content on the screen in response to the received first user action, receive a second user action, after the first user action, requesting to switch the displayed application into the web mode for displaying the content as a web page in a web browser;

display the content in the web browser on the screen in response to the received second user action; and display the content in the web browser on the screen in response to the second user action;

receive a third user action, after the second user action, requesting to switch the displayed content in the web browser into the application mode; and display the application associated with the application mode for the content on the screen in response to the received third user action; and wherein the application mode includes a first menu item for switching to the web mode and the web mode includes a second menu item for switching to the application mode.

10. The digital television apparatus according to claim 9, wherein the processor is configured to receive the second user action by accessing the menu item displayed on an area of the screen.

11. The digital television apparatus according to claim 9, wherein application mode data for the content is collected from a pre-stored application.

12. The digital television apparatus according to claim 9, wherein the content is identical to a content provider connected through a Uniform Resource Locator (URL) for the web page of the content.

13. The digital television apparatus according to claim 9, wherein the processor is further configured to display the application mode based on information on a logged-on user.

14. The digital television apparatus according to claim 9, wherein the processor is further configured to receive a fourth user action for requesting a function of the web page of the content to be applied to the application of the content and update the displayed application of the content by applying the function of the web page of the content in response to the received user action for requesting the function of the web page of the content to be applied to the application of the content.

15. The digital television apparatus according to claim 14, wherein the controller is further configured to obtain position information indicating a position at which the function of the web page of the content is displayed and function information for providing the function of the web page of the content and update the displayed application of the content based on the obtained position information and the obtained function information.

16. The digital television apparatus according to claim 9, wherein the processor is further configured to receive a fourth user action for requesting a setting of the web page of the content to be applied to the application of the content and update the displayed application of the content by applying the setting of the web page of the content in response to the received user action for requesting the setting of the web page of the content to be applied to the application of the content.

* * * * *